(12) United States Patent
Choi

(10) Patent No.: US 10,368,380 B2
(45) Date of Patent: Jul. 30, 2019

(54) WIRELESS COMMUNICATION SYSTEM AND METHOD

(71) Applicant: INTELLECTUAL DISCOVERY CO., LTD., Seoul (KR)

(72) Inventor: Su Han Choi, Gwacheon-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 196 days.

(21) Appl. No.: 15/300,646

(22) PCT Filed: Jan. 15, 2015

(86) PCT No.: PCT/KR2015/000430
§ 371 (c)(1),
(2) Date: Sep. 29, 2016

(87) PCT Pub. No.: WO2015/152502
PCT Pub. Date: Oct. 8, 2015

(65) Prior Publication Data
US 2017/0111952 A1    Apr. 20, 2017

(30) Foreign Application Priority Data

Mar. 31, 2014  (KR) .................. 10-2014-0037974
Mar. 31, 2014  (KR) .................. 10-2014-0037975
Mar. 31, 2014  (KR) .................. 10-2014-0037976

(51) Int. Cl.
| | |
|---|---|
| *H04L 5/00* | (2006.01) |
| *H04L 5/14* | (2006.01) |
| *H04W 16/26* | (2009.01) |
| *H04W 36/18* | (2009.01) |
| *H04W 76/15* | (2018.01) |
| *H04W 76/14* | (2018.01) |

(Continued)

(52) U.S. Cl.
CPC ........... *H04W 76/15* (2018.02); *H04L 5/0048* (2013.01); *H04L 5/14* (2013.01); *H04W 16/26* (2013.01);
(Continued)

(58) Field of Classification Search
CPC ..... H04W 76/15; H04W 76/14; H04W 76/10; H04W 72/0453; H04W 36/18;
(Continued)

(56) References Cited

U.S. PATENT DOCUMENTS

| 2011/0194513 A1 | 8/2011 | Kim |
| 2011/0235571 A1 | 9/2011 | Seo et al. |

(Continued)

FOREIGN PATENT DOCUMENTS

| JP | 2014-030131 A | 2/2014 |
| KR | 10-2010-0086405 A | 7/2010 |

(Continued)

*Primary Examiner* — Oussama Roudani
(74) *Attorney, Agent, or Firm* — Rabin & Berdo, P.C.

(57) ABSTRACT

User equipment included in a wireless communication system wirelessly connects to a donor base-station to establish a macro link, wirelessly connects to a mobile relay to establish an access link, and simultaneously maintains connections with the donor base-station and the mobile relay coexisting in the same coverage area, wherein a first pre-established frequency band can be used for the access link and a second pre-established frequency band can be used for the macro link. Furthermore, the user equipment can wirelessly connect to the mobile relay to establish an access link, be assigned, from the mobile relay, a wireless resource for device-to-device communication with at least one other user equipment within the same mobile relay cell, and perform device-to-device communication with the at least one other user equipment using the assigned wireless resource.

15 Claims, 16 Drawing Sheets

(51) Int. Cl.
  *H04W 76/10*    (2018.01)
  *H04W 88/06*    (2009.01)
  *H04W 72/04*    (2009.01)
  *H04W 88/04*    (2009.01)

(52) U.S. Cl.
  CPC ........... *H04W 36/18* (2013.01); *H04W 72/04* (2013.01); *H04W 72/0453* (2013.01); *H04W 76/10* (2018.02); *H04W 76/14* (2018.02); *H04W 88/06* (2013.01); *H04W 88/04* (2013.01)

(58) Field of Classification Search
  CPC . H04W 76/023; H04W 76/025; H04W 72/04; H04W 76/02; H04W 88/06; H04W 16/26; H04W 88/04; H04W 48/16; H04W 72/0406; H04L 5/0048; H04L 5/14
  See application file for complete search history.

(56) References Cited

U.S. PATENT DOCUMENTS

| | | |
|---|---|---|
| 2012/0201191 A1 | 8/2012 | Seo et al. |
| 2014/0031031 A1* | 1/2014 | Gauvreau ............ H04L 5/0053 455/426.1 |
| 2014/0092787 A1* | 4/2014 | Han ........................ H04W 4/70 370/280 |
| 2015/0223219 A1* | 8/2015 | Nagata ................. H04W 48/16 455/449 |
| 2017/0013566 A1* | 1/2017 | Qu ..................... H04W 52/146 |

FOREIGN PATENT DOCUMENTS

| | | |
|---|---|---|
| KR | 10-2011-0093686 A | 8/2011 |
| KR | 10-2012-0098598 A | 9/2012 |
| KR | 10-2013-0124197 A | 11/2013 |

\* cited by examiner

WIRELESS COMMUNICATION SYSTEM AND METHOD

CROSS-REFERENCE TO RELATED APPLICATIONS

This application claims the benefit of priority PCT Patent Application No. PCT/KR2015/000430 filed in the Korean Intellectual Property Office on Jan. 15, 2015, Korean Patent Application No. 10-2014-0037974, No. 10-2014-0037975 and No. 10-2014-0037976 filed in the Korean Intellectual Property Office on Mar. 31, 2014.

TECHNICAL FIELD

The present disclosure relates to a wireless communication system and method including a mobile relay.

BACKGROUND

In a wireless communication system, various wireless access schemes such as a multi-tier network and a heterogeneous network can interwork with each other. Such a wireless communication system includes relay configured to relay wireless communication between a donor base-station and a user equipment (UE). Generally, a fixed relay constituting a small cell at a fixed location has been widely used. Recently, a mobile relay using a wireless resource as a backhaul and simultaneously functioning as a base station and a relay in a wireless communication system has been actively studied. Such a mobile relay moves autonomously and constitutes a small cell.

In this regard, Korean Patent Laid-open Publication No. 2013-0124197 (entitled "Mobile relay station and handover method thereof") discloses a handover method of a mobile relay station, including: determining, by a mobile relay station relaying data from a subordinate device to a first base station, whether to perform handover from the first base station to a second base station; when it is determined to perform handover in the determining operation, receiving a first message including first information indicating whether handover is admitted, from the first base station; and when handover admission information is included in the first message, transmitting a second message including a service unavailability section during which a service is not provided to the subordinate device, to the subordinate device.

DISCLOSURE OF THE INVENTION

Problems to be Solved by the Invention

An exemplary embodiment of the present disclosure provides a wireless communication system and method that cooperatively uses a macro cell and a mobile relay cell.

Further, another exemplary embodiment of the present disclosure provides a wireless communication system and method that applies a heterogeneous data transmission mode to a macro cell and a mobile relay cell.

Furthermore, yet another exemplary embodiment of the present disclosure provides a wireless communication system and method that conduct device-to-device (D2D) communication between multiple devices included in a mobile relay.

However, problems to be solved by the present disclosure are not limited to the above-described problems. There may be other problems to be solved by the present disclosure.

Means for Solving the Problems

In accordance with an example embodiment, there is provided a user equipment included in a wireless communication system. The user equipment wirelessly accesses a mobile relay to establish an access link, wirelessly accesses a donor base-station to establish a macro link, simultaneously maintains connections with the donor base-station and the mobile relay coexisting in the same coverage area, and conducts wireless communication with the mobile relay through the access link using a pre-established first frequency band and conducts wireless communication with the donor base-station through the macro link using a pre-established second frequency band.

Herein, the user equipment may include a multi-band wireless communication module that conducts wireless communication using multiple frequency bands, conduct the wireless communication through the access link and the macro link using the multi-band wireless communication module, and the first frequency band is higher than the second frequency band.

Further, the user equipment may wirelessly communicate user-plane data including traffic data and data according to a protocol applied to an application layer through the access link, and wirelessly communicate control-plane data including control signaling data for controlling the wireless communication of the user-plane data through the macro link.

Furthermore, the user equipment may conduct wireless communication through the access link using a pre-established first carrier frequency band, conduct wireless communication through the macro link using a second carrier frequency band different from the first carrier frequency band, set any one of the first and second carrier frequency bands as a primary carrier frequency band and the other one as a secondary carrier frequency band, and if a capacity of traffic data is equal to or lower than a predetermined reference data capacity, the user equipment may wirelessly communicate the traffic data using the primary carrier frequency band, and if the capacity of the traffic data is higher than the reference data capacity, the user equipment may wirelessly communicate the traffic data using the primary and secondary carrier frequency bands together.

Moreover, in case of using the primary and secondary carrier frequency bands together, the user equipment may wirelessly communicate a part of the traffic data through the access link using the first carrier frequency band, and wirelessly communicate the remaining traffic data through the macro link using the second carrier frequency band.

Moreover, the user equipment may wirelessly communicate control signaling information for each of the primary carrier frequency band and the secondary carrier frequency band using each of the primary carrier frequency band and the secondary carrier frequency band or using the primary carrier frequency band only, and the control signaling information may include information for controlling the primary and secondary carrier frequency bands to be used together.

Moreover, the user equipment may conduct wireless communication using different data transmission modes for the access link and the macro link, and a data transmission mode used for the access link may be different from a data transmission mode used for a backhaul link established between the donor base-station and the mobile relay and the macro link.

Herein, the data transmission mode used for the access link may be a time division duplex mode, and the data transmission mode used for the macro link and the backhaul link may be a frequency division duplex mode.

Further, the user equipment may dynamically change a resource assignment ratio for each of uplink and downlink through the access link according to predetermined conditions of change, and transmit change information of the resource assignment ratio to the mobile relay, and the change information of the resource assignment ratio may be used in changing a resource assignment ratio of another user equipment within a coverage of the mobile relay as the conditions of change.

In accordance with another example embodiment, there is provided a wireless communication method of a user equipment included in a wireless communication system. The wireless communication method of a user equipment includes: establishing a macro link by wireless access to a donor base-station; establishing an access link by wireless access to a mobile relay; and simultaneously maintaining connections with the donor base-station and the mobile relay coexisting in the same coverage area, and the access link may use a pre-established first frequency band and the macro link uses a pre-established second frequency band.

Herein, the first frequency band is higher than the second frequency band.

Further, the step of simultaneously maintaining of connections may include: wirelessly communicating user-plane data through the access link; and wirelessly communicating control-plane data through the macro link, and the user-plane data may include traffic data and data according to a protocol applied to an application layer, and the control-plane data include control signaling data for controlling the wireless communication of the user-plane data.

Furthermore, the step of simultaneously maintaining of connections may include: conducting wireless communication through the access link using a pre-established first carrier frequency band; and conducting wireless communication through the macro link using a second carrier frequency band different from the first carrier frequency band.

Moreover, the wireless communication method of a user equipment may include setting any one of the first and second carrier frequency bands as a primary carrier frequency band and the other one as a secondary carrier frequency band, before the step of simultaneously maintaining of connections. Herein, the step of simultaneously maintaining of connections may include: if a capacity of traffic data is equal to or lower than a predetermined reference data capacity, wirelessly communicating the traffic data using the primary carrier frequency band; and if the capacity of the traffic data is higher than the reference data capacity, wirelessly communicating the traffic data using the primary and secondary carrier frequency bands together.

Moreover, in case of using the primary and secondary carrier frequency bands together, a part of the traffic data may be wirelessly communicated through the access link using the first carrier frequency band, and the remaining traffic data may be wirelessly communicated through the macro link using the second carrier frequency band.

Moreover, the step of simultaneously maintaining of connections may include: wirelessly communicating control signaling information for each of the primary carrier frequency band and the secondary carrier frequency band using each of the primary carrier frequency band and the secondary carrier frequency band or using the primary carrier frequency band only, and the control signaling information may include information for controlling the primary and secondary carrier frequency bands to be used together.

Moreover, the step of simultaneously maintaining of connections may include: conducting wireless communication using different data transmission modes for the access link and the macro link, and a data transmission mode used for the access link may be different from a data transmission mode used for a backhaul link established between the donor base-station and the mobile relay and the macro link.

Moreover, the step of conducting of wireless communication may include: conducting wireless communication through the access link using a time division duplex mode; and conducting wireless communication through the macro link and the backhaul link using a frequency division duplex mode.

Moreover, the step of conducting of wireless communication may include: dynamically changing a resource assignment ratio for each of uplink and downlink through the access link according to predetermined conditions of change; and transmitting change information of the resource assignment ratio to the mobile relay, and the change information of the resource assignment ratio may be used in changing a resource assignment ratio of another user equipment within a coverage of the mobile relay as the conditions of change.

Meanwhile, in accordance with still another example embodiment, there is provided a user equipment included in a wireless communication system. The user equipment wirelessly accesses a mobile relay to establish an access link, is assigned a wireless resource for device-to-device communication with at least one another user equipment included in the same mobile relay cell from the mobile relay, and conducts device-to-device communication with the at least one another user equipment using the assigned wireless resource.

Herein, the user equipment may receive control signaling data for controlling the device-to-device communication from the mobile relay through the access link, and directly conduct wireless communication of traffic data with the another user equipment through the device-to-device communication.

Further, the user equipment may be assigned a part of a wireless resource used for uplink communication through the access link from the mobile relay.

Furthermore, the user equipment may conduct wireless communication through the access link in a frequency division duplex mode or a time division duplex mode, be assigned a part of a frequency band used for the uplink communication in case of wireless communication in the frequency division duplex mode, and assigned a part of a time band used for the uplink communication in case of wireless communication in the time division duplex mode.

Moreover, the user equipment may transmit a device-to-device communication mode configuration request including information about the at least one another user equipment to the mobile relay, and be assigned the wireless resource from the mobile relay.

Moreover, the user equipment may transmit state information of a channel with respect to the at least one another user equipment to the mobile relay, receive wireless resource assignment information and transmission format information for device-to-device communication determined by the mobile relay on the basis of the channel state information, and transmit a demodulation reference signal based on the transmission formation information to the at least one another user equipment.

In accordance with yet another example embodiment, there is provided a wireless communication method of a user equipment included in a wireless communication system. The wireless communication method of a user equipment includes: establishing an access link by wireless access to a mobile relay; being assigned a wireless resource for deviceto-device communication with at least one another user equipment included in the same mobile relay cell from the mobile relay; and conducting device-to-device communication with the at least one another user equipment using the assigned wireless resource.

Herein, the wireless communication method of a user equipment may include receiving control signaling data for controlling the device-to-device communication through the access link, after the step of establishing of an access link. The step of conducting of device-to-device communication may include directly conducting wireless communication of traffic data with the another user equipment.

Further, the step of being assigned of a wireless resource may include being assigned a part of a wireless resource used for uplink communication through the access link.

Furthermore, the step of being assigned of a part of a wireless resource used for uplink communication may include: being assigned a part of a frequency band used for the uplink communication in case of wireless communication through the access link in a frequency division duplex mode; and being assigned a part of a time band used for the uplink communication in case of wireless communication through the access link in a time division duplex mode.

Moreover, the wireless communication method of a user equipment may include transmitting a device-to-device communication mode configuration request including information about the at least one another user equipment to the mobile relay, before the step of being assigned of a wireless resource for device-to-device communication.

Moreover, the step of transmitting of a device-to-device communication mode configuration request to the mobile relay may include: transmitting state information of a channel with respect to the at least one another user equipment to the mobile relay through the access link; receiving wireless resource assignment information and transmission format information for device-to-device communication determined by the mobile relay on the basis of the channel state information through the access link; and transmitting a demodulation reference signal based on the transmission formation information to the at least one another user equipment.

Effects of the Invention

According to any one of the above-described aspects of the present disclosure, when a user equipment is connected to both of a donor base-station and a mobile relay, a macro cell and a mobile relay cell are cooperatively used to provide a wireless communication service. Thus, it is possible to increase wireless communication efficiency.

Further, according to any one of the above-described aspects of the present disclosure, when a macro cell and a mobile relay cell are cooperatively used in a wireless communication system, a higher frequency band is used for an access link of the mobile relay cell than for a communication link of the macro cell. Thus, a mobile relay can stably maintain communication connections with multiple user equipments within the mobile relay cell by conducting wireless communication with the user equipments at a high speed with low power and also improve data transmission efficiency. Further, a donor base-station using a lower frequency band than the mobile relay can readily secure a coverage and thus stably manage wireless communication with multiple mobile relays and user equipments within the macro cell.

Furthermore, according to any one of the above-described aspects of the present disclosure, when a macro cell and a mobile relay cell are cooperatively used in a wireless communication system, control signaling data and traffic data are separated for wireless communication, and, thus, it is possible to efficiently conduct wireless communication. That is, control-plane data communication requires a lower data demand than user-plane data communication, and, thus, control-plane data can be transmitted and received stably using the macro cell with a lower handoff occurrence rate than the mobile relay cell and user-plane data can be transmitted at a high speed through the mobile relay cell which can use a broad frequency band.

Moreover, according to any one of the above-described aspects of the present disclosure, when a macro cell and a mobile relay cell are cooperatively used in a wireless communication system, in case of communication of massive traffic data to a user equipment, the traffic data can be transmitted at a high speed by aggregating wireless resources of the macro cell and the mobile relay cell (carrier aggregation (CA)).

Further, according to any one of the above-described aspects of the present disclosure, due to low interference of a mobile relay cell in an adjacent mobile relay cell, a heterogeneous data transmission mode can be applied to a macro cell and a mobile relay cell. Thus, it is possible to efficiently conduct wireless data communication.

Furthermore, according to any one of the above-described aspects of the present disclosure, a macro cell uses a frequency division duplex mode and a mobile relay cell uses a time division duplex mode. Thus, in case of wireless communication with a mobile relay, it is possible to dynamically change a resource assignment ratio of an uplink and a downlink.

Moreover, according to any one of the above-described aspects of the present disclosure, it is possible efficiently conduct infrastructure-based D2D communication between devices included in the same relay cell in a wireless communication environment Further, effects to be achieved by the present disclosure are not limited to the above-described effects. There may be other effects to be achieved by the present disclosure.

MODE FOR CARRYING OUT THE INVENTION

Figure 1:
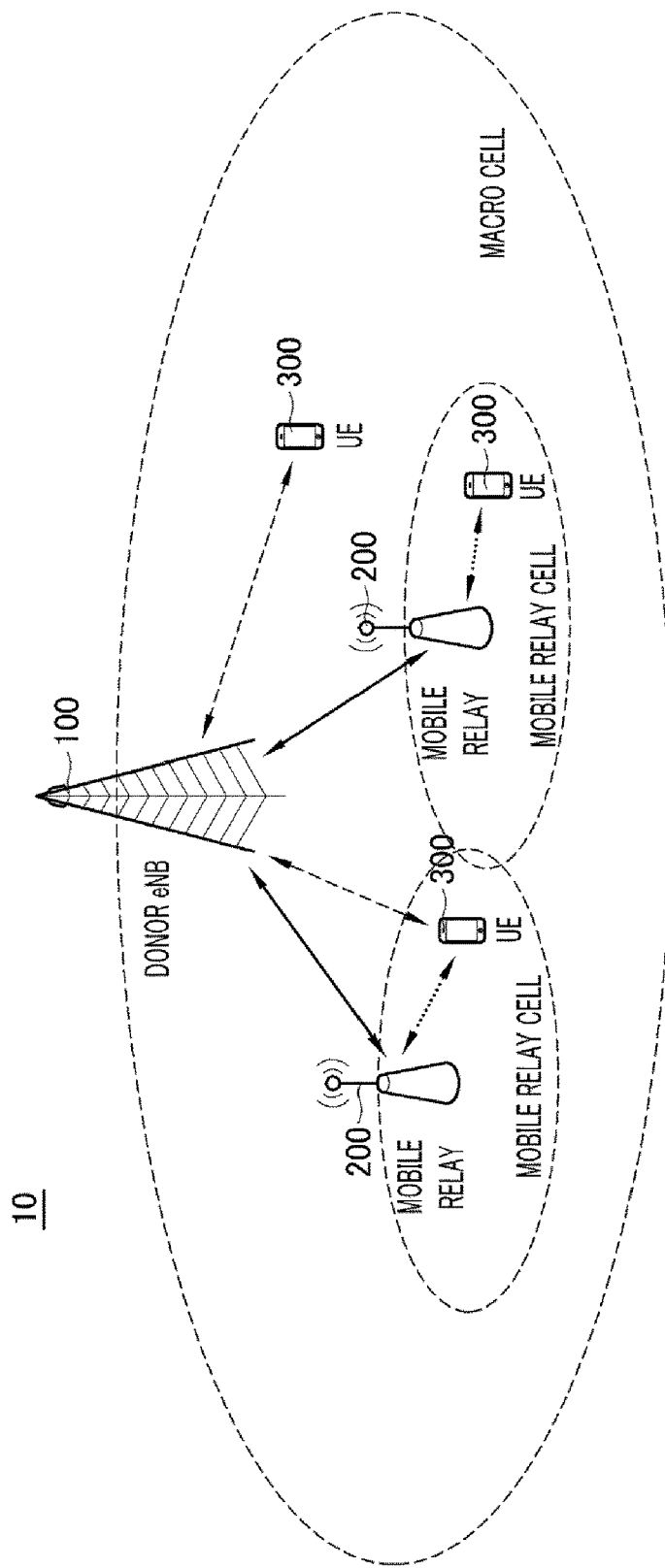
FIG. 1 is a configuration of a wireless communication system in accordance with an exemplary embodiment.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a configuration of a wireless communication system in accordance with an exemplary embodiment.

As illustrated in FIG. 1, a wireless communication system 10 in accordance with an exemplary embodiment includes a donor base-station (donor eNB) 100, a mobile relay 200, and a user equipment (UE) 300.

A coverage of the donor eNB 100 is a macro cell and a coverage of the mobile relay 200 is a mobile relay cell.

The wireless communication system 10 in accordance with an exemplary embodiment may be a wireless communication system such as an E-UTRA (Evolved Universal Terrestrial Radio Access) system. Besides, the wireless communication system 10 may be implemented on various wireless communication networks using inter and intra wireless access network interfaces among wireless network entities.

The donor eNB 100 is a wireless base station and serves as a network unit configured to communicate with the UE and the mobile relay in a serving cell. The donor eNB 100 assigns a wireless resource to the UE and the mobile relay. The donor eNB 100 may be variously referred to as NodeB, eNB (evolved Node B), BTS (Base Transceiver Station), BS (Base Station), AP BS (Access Point Base-station), etc. depending on the applied wireless access technology.

The mobile relay 200 moves autonomously and serves as a network unit configured to relay wireless communication between the UE and the base station. The mobile relay 200 may function as a base station by using the wireless resource assigned from the donor eNB 100 as a wireless backhaul.

The UE 300 is a device configured to conduct wireless communication with the donor eNB 100 and the mobile relay 200. The UE 300 may be variously referred to as a wireless communication equipment, a wireless device, or a node depending on the applied wireless access technology. For example, the UE 300 may be a wireless communication device that ensures portability and mobility and may include handheld-based portable devices, laptops, mobile sensors, etc. For reference, the UE 300 includes a device and a smart phone.

As illustrated in FIG. 1, in the wireless communication system 10 in accordance with an exemplary embodiment, at least one mobile relay 200 may be present within a coverage (i.e., macro cell) of the donor eNB 100. Further, at least one UE 300 may be present within a coverage (i.e., mobile relay cell) of each mobile relay 200. That is, the UE 300 may simultaneously access the donor eNB 100 and the mobile relay 200 coexisting in the same coverage area or may access any one of the donor eNB 100 and the mobile relay 200.

The UE 300 which is located in the macro cell but not included in the mobile relay cell conducts wireless communication with the donor eNB 100 by establishing a direct communication link. The UE 300 which is included in the macro cell and the mobile relay cell may be connected to the mobile relay 200 to conduct wireless communication with the donor eNB 100 through the mobile relay 200, or may wirelessly access each of the mobile relay 200 and the donor eNB 100 to conduct wireless communication while simultaneously maintaining connections with the mobile relay 200 and the donor eNB 100.

Hereinafter, a configuration and an operation of the wireless communication system 10 in accordance with an exemplary embodiment will be described in detail with reference to FIG. 2 to FIG. 10.

Firstly, a handoff process in the wireless communication system in accordance with an exemplary embodiment will be described with reference to FIG. 2 to FIG. 5.

Figure 2:
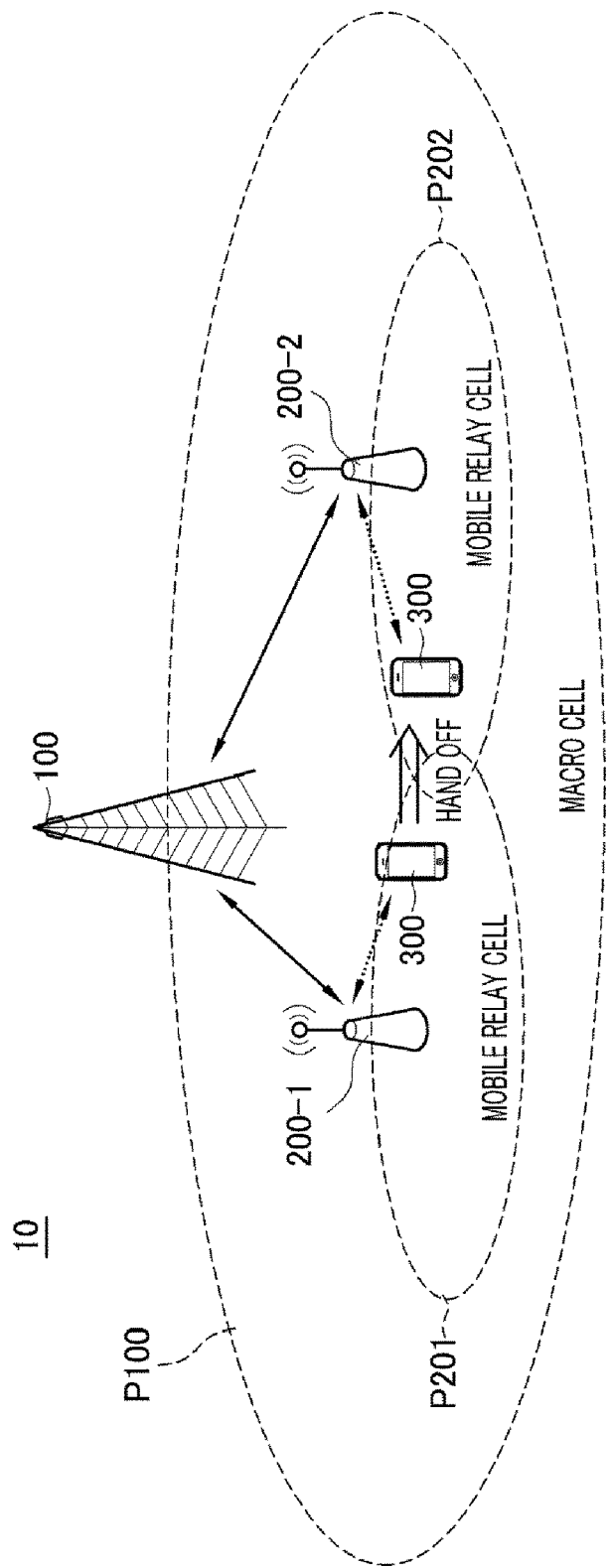
FIG. 2 is a diagram provided to explain handoff between mobile relays in the same macro cell in accordance in accordance with an exemplary embodiment.

FIG. 2 is a diagram provided to explain a handoff process of a user equipment between multiple mobile relays included in the same macro cell in accordance in accordance with an exemplary embodiment.

As illustrated in FIG. 2, if multiple mobile relays 200-1 and 200-2 are present within a coverage of one donor eNB 100, the UE 300 may move within the same macro cell P100 to enter a second mobile relay cell P202 from a first mobile relay cell P201. In this case, the UE 300 performs handoff from the first mobile relay 200-1 in the first mobile relay cell P201 to the second mobile relay 200-2 in the second mobile relay cell P202. Herein, each of the components (i.e., donor eNB, two or more mobile relays, and UE) of the wireless communication system 10 performs a predetermined "handoff process between mobile relays in the same macro cell".

Figure 3:
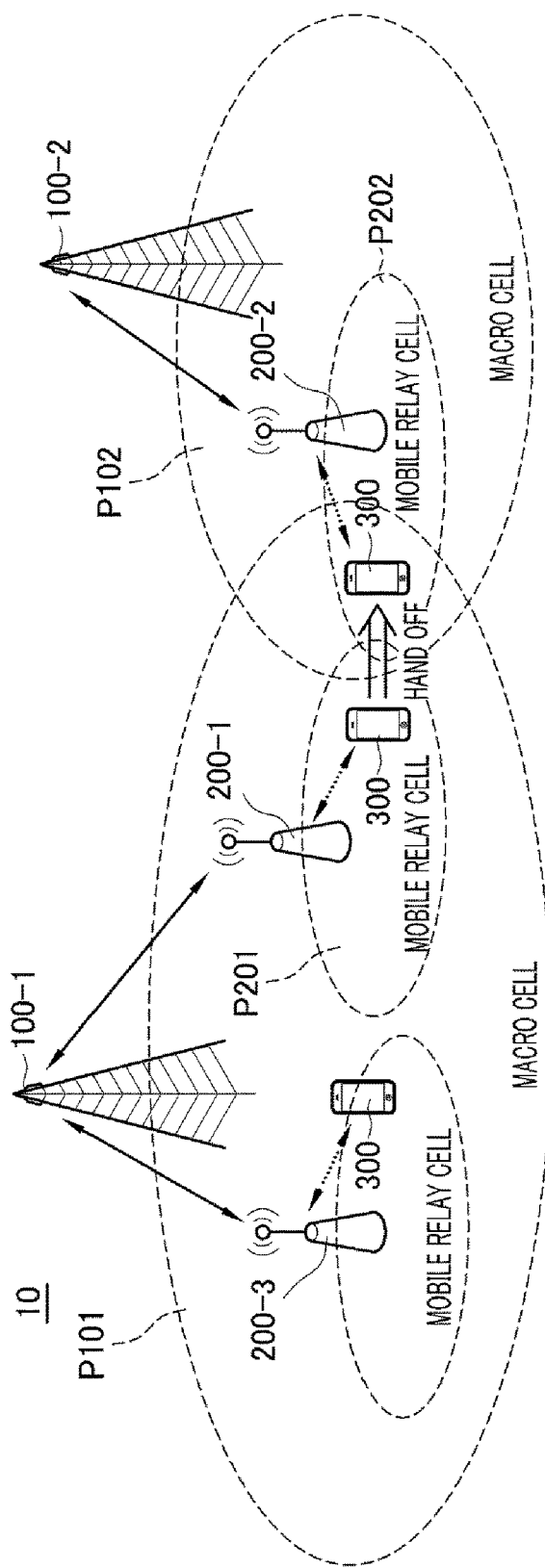
FIG. 3 is a diagram provided to explain handoff between mobile relays in different macro cells in accordance in accordance with an exemplary embodiment.

FIG. 3 is a diagram provided to explain a handoff process of a user equipment between mobile relays included in different macro cells in accordance in accordance with an exemplary embodiment.

As illustrated in FIG. 3, if multiple mobile relays 200-1, 200-2, and 200-3 are present within coverages of two or more donor eNBs 100-1 and 100-2, the UE 300 may move from a first macro cell P101 to a second macro cell P102 to enter the second macro cell P102 from the first macro cell P101. In this case, the UE 300 performs handoff from the first mobile relay 200-1 in the first macro cell P101 to the second mobile relay 200-2 in the second macro cell P102. In this case, the UE 300 performs not only the handoff process between the multiple mobile relays 200-1 and 200-2 but also a handoff process between the multiple donor eNBs 100-1 and 100-2. Herein, each of the components (i.e., two or more donor eNBs, two or more mobile relays, and UE) of the wireless communication system 10 performs a predetermined "handoff process between mobile relays in different macro cells".

Figure 4:
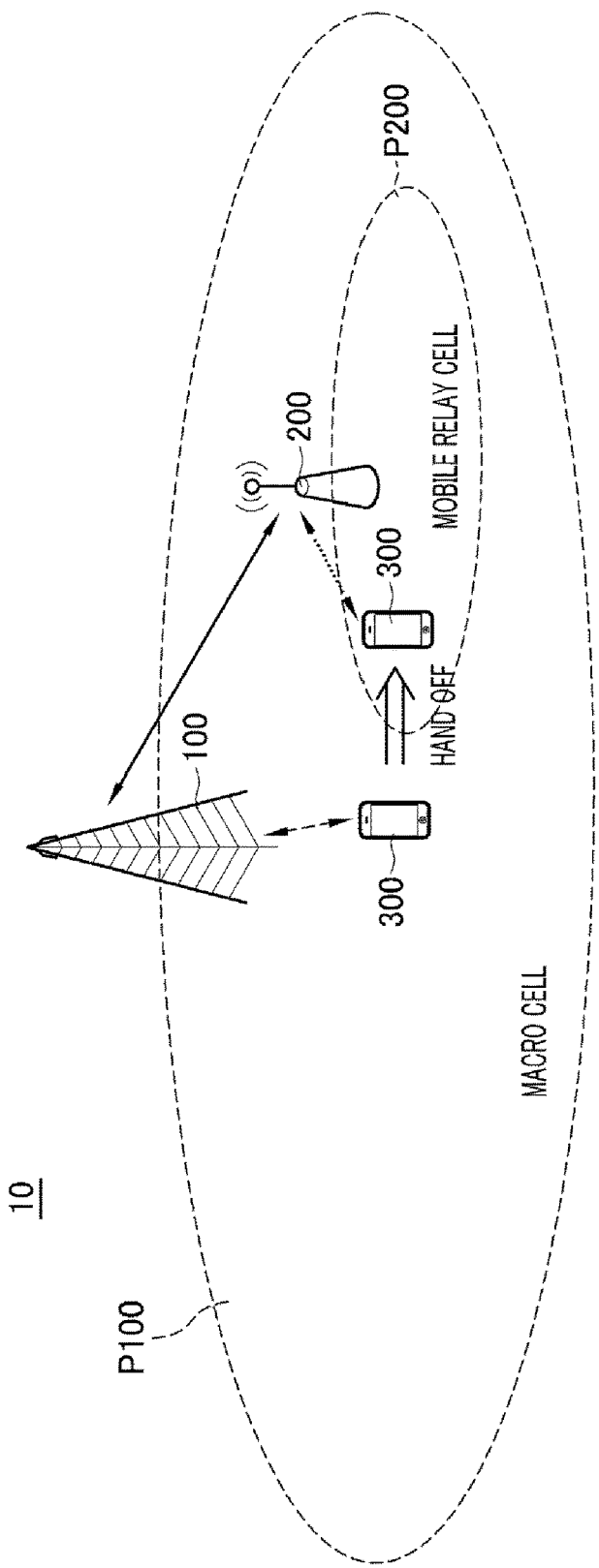
FIG. 4 is a diagram provided to explain handoff from a macro cell to a mobile relay cell in accordance in accordance with an exemplary embodiment.

FIG. 4 is a diagram provided to explain a handoff process of a user equipment from a macro cell to a mobile relay cell in accordance in accordance with an exemplary embodiment.

As illustrated in FIG. 4, if the mobile relay 200 is present within a coverage of the donor eNB 100, the UE 300 maintaining a connection with the donor eNB 100 may enter a coverage (i.e., mobile relay cell P200) of the mobile relay 200 within the macro cell P100. In this case, the UE 300 performs handoff from the donor eNB 100 in the macro cell P100 to the mobile relay 200 in the mobile relay cell P200. Herein, each of the components (i.e., donor eNB, mobile relay, and UE) of the wireless communication system 10 performs a predetermined "handoff process from a macro cell to a mobile relay cell".

Figure 5:
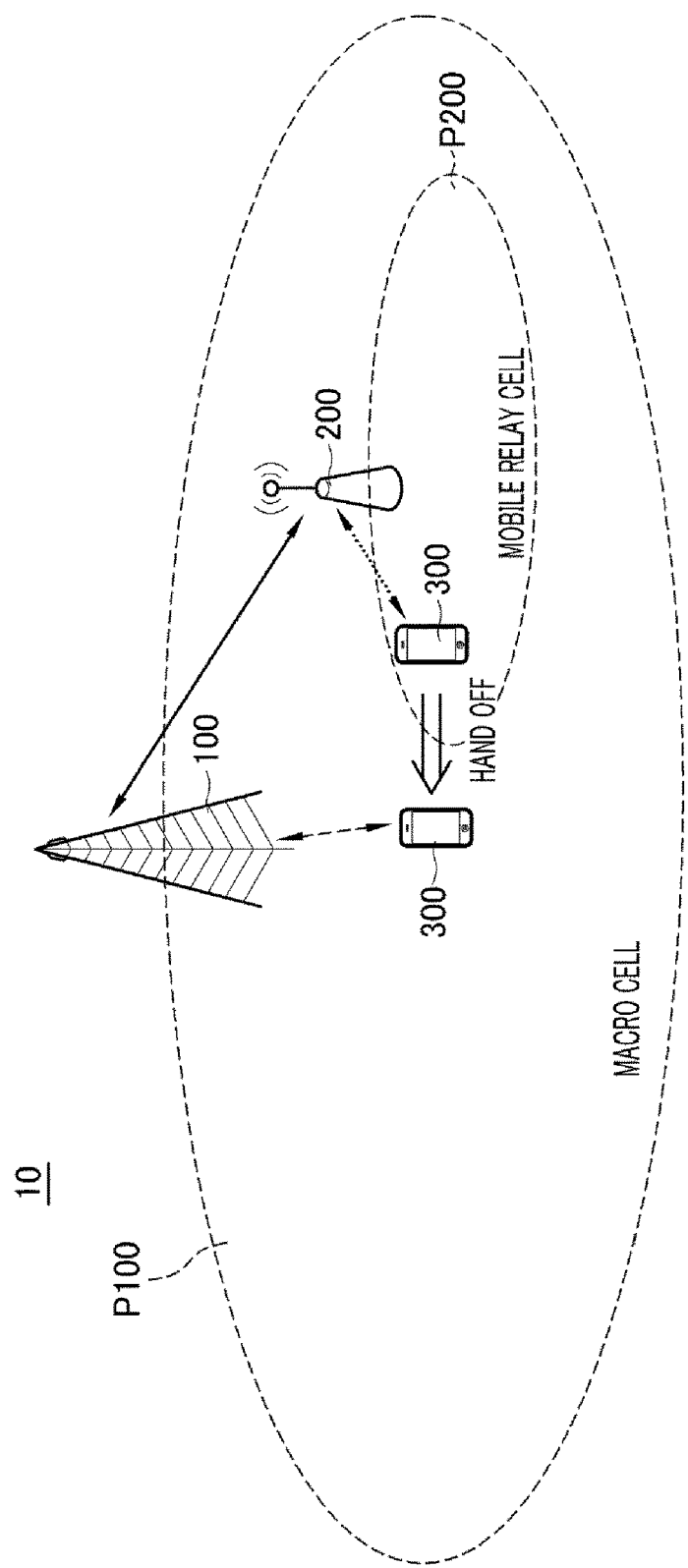
FIG. 5 is a diagram provided to explain handoff from a mobile relay cell to a macro cell in accordance in accordance with an exemplary embodiment.

FIG. 5 is a diagram provided to explain a handoff process of a user equipment from a mobile relay cell to a macro cell in accordance in accordance with an exemplary embodiment.

As illustrated in FIG. 5, if the mobile relay 200 is present within a coverage of the donor eNB 100, the UE 300 maintaining a connection with the mobile relay 200 within the mobile relay cell P200 may get out of the mobile relay cell P200 and enter the macro cell P100. In this case, the UE 300 performs handoff from the mobile relay 200 in the mobile relay cell P200 to the donor eNB 100 in the macro cell P100. Herein, each of the components (i.e., donor eNB, mobile relay, and UE) of the wireless communication system 10 performs a predetermined "handoff process from a mobile relay cell to a macro cell".

Meanwhile, as described above, the UE 300 in the wireless communication system 10 is connected to at least one of the donor eNB 100 and the mobile relay 200 and conducts wireless communication. Particularly, the wireless communication system 10 conducts wireless communication by cooperatively using a macro cell and a mobile relay cell when the UE 300 accesses both of the donor eNB 100 and the mobile relay 200.

In the wireless communication system 10, each of the components (i.e., donor eNB, mobile relay, and UE) establishes a communication link by wireless access to each other. If the mobile relay 200 wirelessly accesses the donor eNB 100, a backhaul link is established. If the UE 300 wirelessly accesses the mobile relay 200, an access link is established. If the UE 300 directly and wirelessly accesses the donor eNB 100, a macro link is established.

In the wireless communication system 10, mobile relays 200 within one macro cell P100 individually move, and, thus, a status of a backhaul link between the donor eNB 100 and the mobile relay 200 may be continuously changed. That is, a channel gain is frequently changed depending on a location of the mobile relay 200 within the macro cell P100 and a channel state. Therefore, the donor eNB 100 detects a change in transmission capacity through a backhaul link for each mobile relay 200 within its coverage, and according to the result of detection, establishment of a backhaul link to the mobile relay 200 and the UE 30 is scheduled.

Further, in the wireless communication system 10, a backhaul link between the UE 300 and the donor eNB 100 and an access link between the UE 300 and the mobile relay 200 may use different transmission modes. In the wireless communication system 10, variables to be considered during handoff are set in advance for each of backhaul links and access links, and while handoff is performed, values of the parameters may be detected or calculated. The donor eNB 100 and the mobile relay 200 stably perform a handoff process by applying preset variables (e.g., "link signal intensity", etc.) depending on a communication link characteristic between the UE 300 and its handoff target.

Hereinafter, a cooperative wireless communication mode between a macro cell and a mobile relay cell in the wireless communication system 10 in accordance with an exemplary embodiment will be described in detail with reference to FIG. 6 to FIG. 8.

Figure 6:
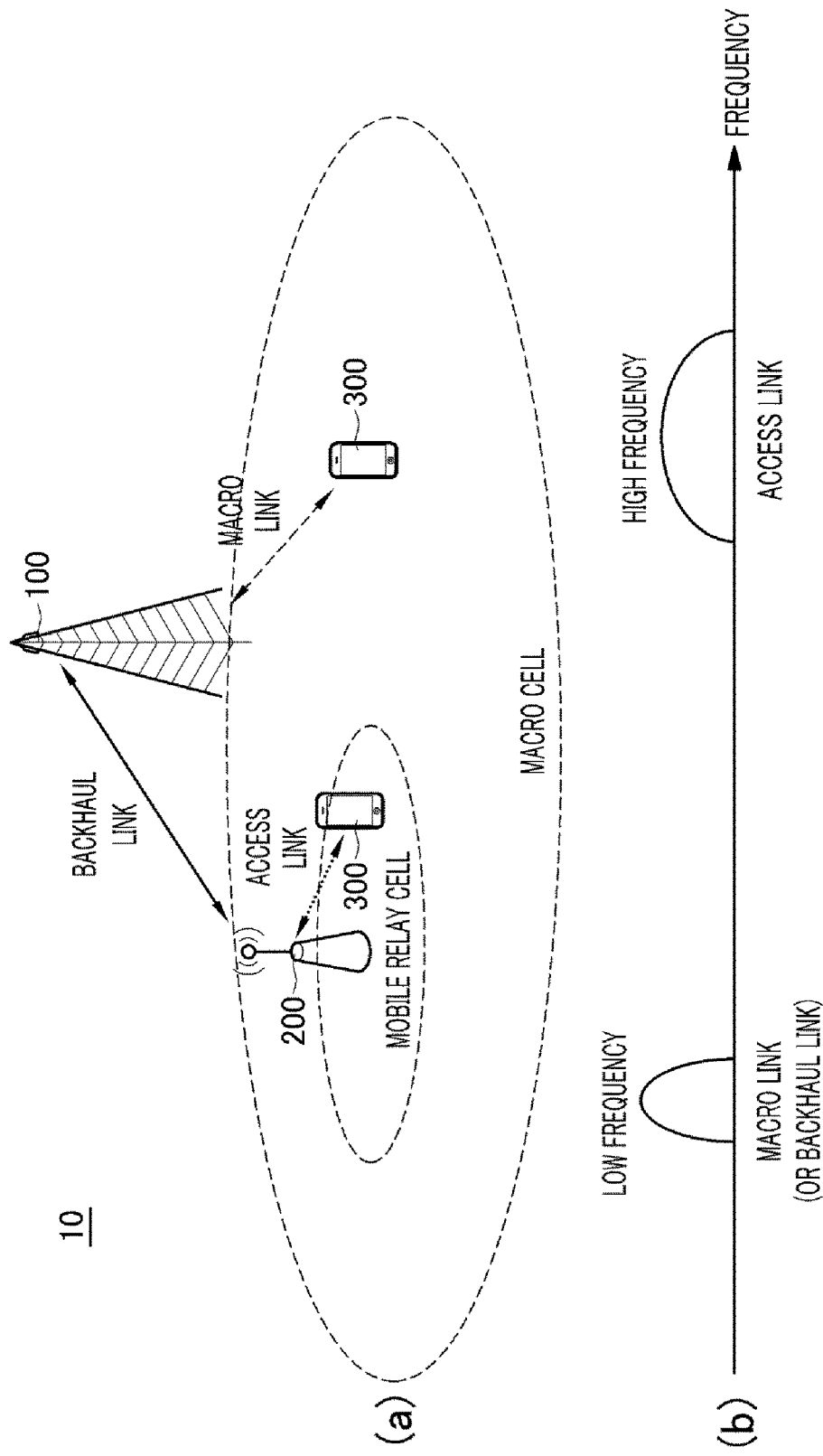
FIG. 6 is a diagram provided to explain a wireless communication mode using a multi-frequency between a macro cell and a mobile relay cell in accordance with an exemplary embodiment.

FIG. 6 is a diagram provided to explain a wireless communication mode using a multi-frequency between a macro cell and a mobile relay cell in accordance with an exemplary embodiment.

Illustration (a) of FIG. 6 illustrates that when the mobile relay 200 and the donor eNB 100 coexist within the same coverage area, the UE 300 simultaneously maintains connections with the mobile relay 200 and the donor eNB 100. In this case, an access link between the UE 300 and the mobile relay 200 and a macro link between the UE 300 and the donor eNB 100 can conduct wireless communication using different frequency bands.

Specifically, as illustrated in illustration (b) of FIG. 6, the access link uses a first frequency band which is a relatively high frequency band, and the macro link uses a second frequency band lower than the first frequency band. Further, a backhaul link between the donor eNB 100 and the mobile relay 200 and the macro link between the donor eNB 100 and the UE 300 may use the same frequency band, and the access link between the mobile relay 200 and the UE 300 may use a higher frequency band than the backhaul link and the macro link.

The first frequency band uses a high frequency band and the second frequency band uses a low frequency band. Thus, the macro cell constitutes a large cell having a wide cell coverage and the mobile relay cell constitutes a small cell having a narrower cell coverage than the macro cell. Therefore, the mobile relay 200 that establishes an access link using the first frequency band manages a narrower cell (i.e., mobile relay cell) than the donor eNB 100 that establishes a macro link and a backhaul link using the second frequency band which is a relatively low frequency band, but can conduct wireless communication at a higher speed with lower power than the macro cell since it uses the high frequency band. That is, the macro cell using a relatively low frequency band can readily secure a wide coverage and thus stably manage wireless communication with multiple mobile relays and UEs within the cell. Further, the mobile relay cell using a relatively high frequency band conducts wireless communication with multiple UEs at a high speed with low power and thus can stably maintain a communication connection with the UEs and also increase data transmission efficiency.

The locations and sizes of the first frequency band and the second frequency band are not limited. Thus, the first frequency band and the second frequency band may be set to be spaced from each other by a predetermined frequency size or more, or may be set as consecutive frequency bands. By way of example, although the first frequency band is a relatively high frequency band as compared with the second frequency band, both of the first and second frequency bands may be cellular mobile communication frequency bands as shown in the following Table 1.

TABLE 1

|  | first frequency band | second frequency band |
| --- | --- | --- |
| Case 1 | 1.8~2.7 GHz | 700~900 MHz |
| Case 2 | 3~5 GHz | 700~900 MHz |
| Case 3 | 10~30 GHz | 700~900 MHz |
| Case 4 | 3~5 GHz | 1.8~2.7 GHz |

Figure 7:
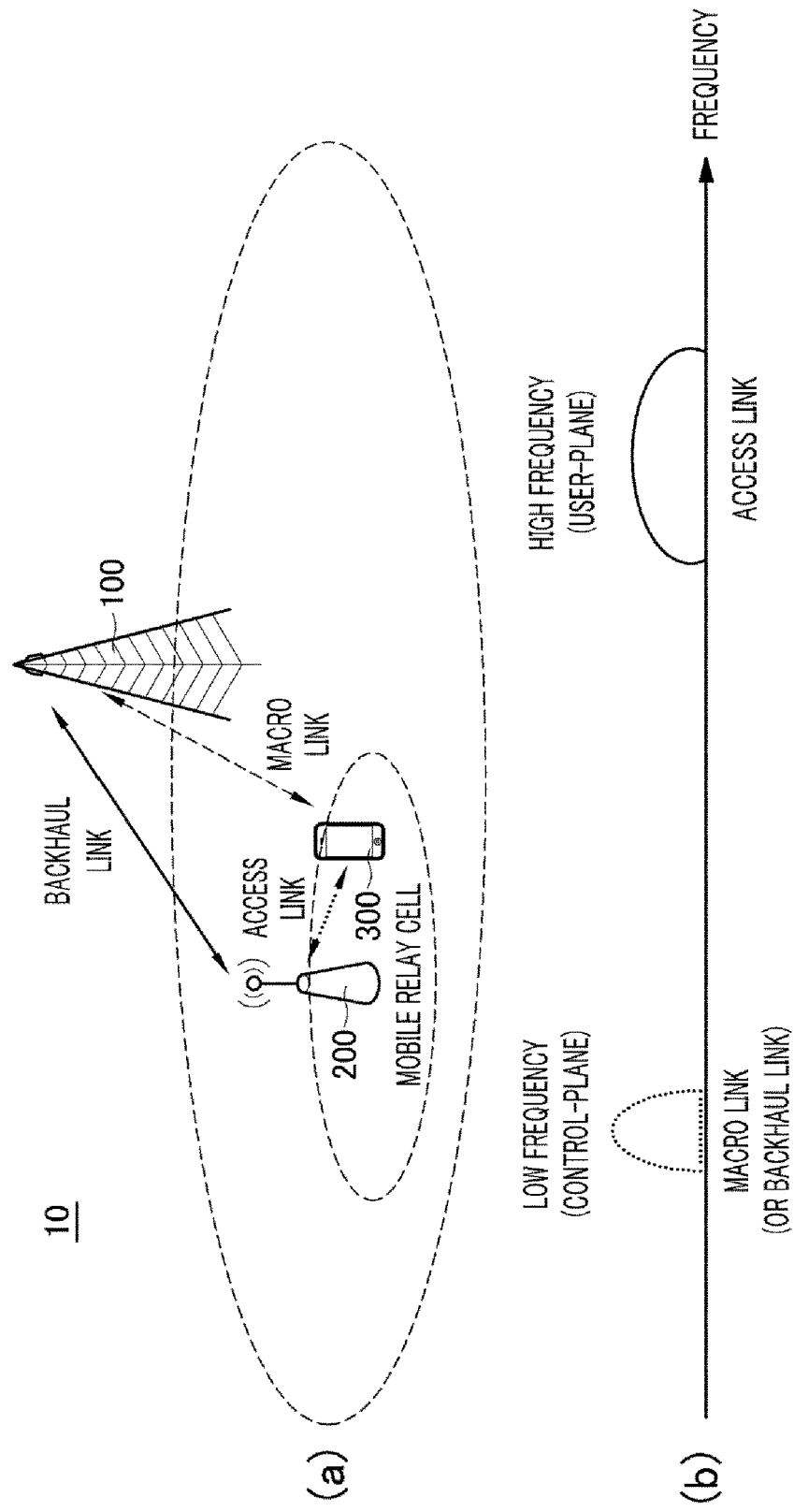
FIG. 7 is a diagram provided to explain a wireless communication mode by segregation of a control plane and a user plane between a macro cell and a mobile relay cell in accordance with an exemplary embodiment.

FIG. 7 is a diagram provided to explain a wireless communication mode by segregation of a control plane and a user plane between a macro cell and a mobile relay cell in accordance with an exemplary embodiment.

Illustration (a) of FIG. 7 illustrates that when the mobile relay 200 and the donor eNB 100 coexist within the same coverage area, the UE 300 simultaneously maintains connections with the mobile relay 200 and the donor eNB 100. In this case, user-plane data are wirelessly communicated through an access link between the mobile delay 200 and the UE 300, and control-plane data are wirelessly communicated through a macro link between the donor eNB 100 and the UE 300. The user-plane data include traffic data generated during data communication with the UE 300 and data according to a protocol for an operation of an application layer. The control-plane data include various control signaling data required to control wireless communication of the user-plane data. For example, the control-plane data include control signaling data for performing user authentication, mobility control, security, and call processing.

Specifically, as illustrated in illustration (b) of FIG. 7, the macro link established between the donor eNB 100 and the UE 300 uses a lower frequency band than the access link, and the control-plane data are wirelessly communicated through the macro link. Further, the access link established between the mobile delay 200 and the UE 300 uses a higher frequency band than the macro link (or backhaul link), and the user-plane data are wirelessly communicated through the access link.

For reference, control-plane data communication requires a lower data demand than user-plane data communication and thus can be sufficiently conducted at a low data transmission speed. Therefore, it is possible to stably transmit and receive control-plane data through wireless communication with the macro cell with a lower handoff occurrence rate than the mobile relay cell. Meanwhile, the mobile relay cell has a narrower cell coverage than the macro cell but uses a higher frequency band. Thus, the mobile relay cell can use a broad frequency band and transmit user-control data at a high speed. As such, it is possible to efficiently conduct wireless data communication through cooperative wireless communication between the macro cell and the mobile relay cell.

In an exemplary embodiment of the present disclosure, there has been illustrated that different frequency bands are used for wireless communication of control-plane data and user-plane data, respectively. However, the same frequency band can be used for wireless communication of control-plane data and user-plane data.

Figure 8:
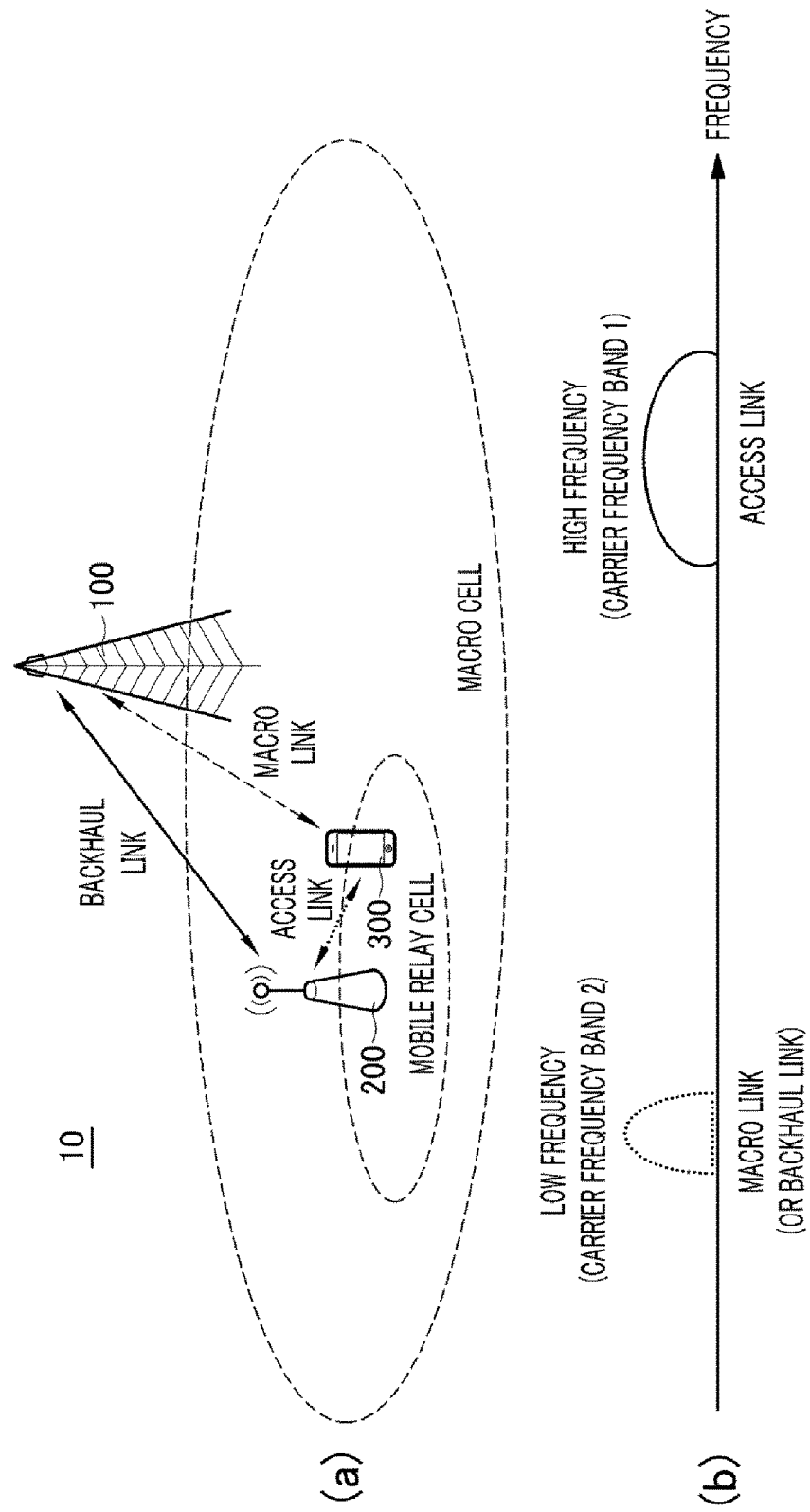
FIG. 8 is a diagram provided to explain a wireless communication mode by carrier aggregation between a macro cell and a mobile relay cell in accordance with an exemplary embodiment.

FIG. 8 is a diagram provided to explain a wireless communication mode by carrier aggregation (CA) between a macro cell and a mobile relay cell in accordance with an exemplary embodiment.

Illustration (a) of FIG. 8 illustrates that when the mobile relay 200 and the donor eNB 100 coexist within the same coverage area, the UE 300 simultaneously maintains connections with the mobile relay 200 and the donor eNB 100. In this case, the wireless communication system 10 conducts wireless data communication by carrier aggregation (CA) between the macro cell and the mobile relay cell.

Specifically, as illustrated in illustration (b) of FIG. 8, an access link between the mobile relay 200 and the UE 300 conducts wireless communication using a carrier frequency band 1, and a macro link between the donor eNB 100 and the UE 300 conducts wireless communication using a carrier frequency band 2 different from the carrier frequency band 1.

Herein, the wireless communication system 10 may set any one of the carrier frequency band 1 and the carrier frequency band 2 as a primary carrier frequency band and set the other one as a secondary carrier frequency band. There may be multiple secondary carrier frequency bands, and the primary carrier frequency band and the secondary carrier frequency band may be set to any one of the carrier frequency bands 1 and 2.

Hereinafter, an example where the carrier frequency band 1 used for the access link between the mobile relay 200 and the UE 300 is set as a primary carrier frequency band will be described.

The wireless communication system 10 determines whether or not to perform a carrier aggregation process depending on a capacity of traffic data of the UE 300 that maintains connections with both of the macro cell and the mobile relay cell.

If the capacity of traffic data of the UE 300 is equal to or lower than a predetermined reference data capacity, the UE 300 conducts wireless communication of the traffic data using only the primary carrier frequency band (i.e., carrier frequency band 1). That is, the traffic data of the UE 300 are wirelessly communicated through the access link. If the capacity of traffic data of the UE 300 is higher than the reference data capacity, the UE 300 conducts wireless communication of the traffic data using both of the primary carrier frequency band and secondary carrier frequency band (i.e., carrier frequency bands 1 and 2). That is, the UE 300 has massive traffic data, the traffic data are divided and then wirelessly communicated through the access link and the macro link, and, thus, a transmission speed of the traffic data can be increased.

Further, the wireless communication system 10 may transmit control signaling information for controlling carrier aggregation using at least one of the primary carrier frequency band and the secondary carrier frequency band. The control signaling information includes scheduling and frequency resource assignment information. Herein, the wireless communication system 10 may wirelessly communicate the control signaling information using each of the primary carrier frequency band and the secondary carrier frequency band. Furthermore, the wireless communication system 10 may wirelessly communicate control signaling information for each of the primary and secondary carrier frequency bands using only the primary carrier frequency band.

Moreover, the wireless communication system 10 may set up a carrier aggregation process by transmitting and receiving a message relevant to the carrier aggregation process to and from the donor eNB 100, the mobile relay 200, and the UE 300. Specifically, when the traffic data of the UE 300 is divided and transmitted through multiple carrier frequency bands, the wireless communication system 10 communicates carrier aggregation messages for the respective carrier frequency bands. For example, while carrier aggregation is performed, each of the components (i.e., donor eNB, mobile relay, and UE) of the wireless communication system 10 may use a HARQ (Hybrid Automatic Repeat reQuest) transmission method, and retransmission in HARQ is performed through each of the carrier frequency bands.

In FIG. 6 to FIG. 8, there has been explained that during cooperative wireless communication between the macro cell and the mobile relay cell, the wireless communication system 10 conducts wireless communication through the access link and wireless communication through the macro link (or backhaul link) using different frequency bands (inter-band). For reference, the wireless communication system 10 may conduct cooperative wireless communication through the access link and the macro link (or backhaul link) using the same frequency band (intra-band).

Hereinafter, operations of the respective components of the wireless communication system 10 for implementing operative wireless communication between the macro cell and the mobile relay cell in accordance with an exemplary embodiment will be described in detail.

Firstly, an operation and a wireless communication mode of the UE 300 of the wireless communication system 10 will be described.

The UE 300 establishes an access link by wireless access to the mobile relay 200 and established a macro link by wireless access to the donor eNB 100. The UE 300 simultaneously maintains connections with a donor eNB and a mobile relay coexisting in the same coverage area.

The UE 300 includes a multi-band wireless communication module that conducts wireless communication using multiple frequency bands. The UE 300 conducts wireless communication through the access link and the macro link using the multi-band wireless communication module.

Specifically, the UE 300 conducts wireless communication with the mobile relay 200 through the access link using the first frequency band and conducts wireless communication with the donor eNB 100 through the macro link using the second frequency band. Herein, the first frequency band and the second frequency band may be different from each other, and the first frequency band may be set to be higher than the second frequency band. The wireless communication using the first frequency band can be conducted in a narrower cell at a higher speed with lower power than the wireless communication using the second frequency band.

Further, the UE 300 conducts wireless communication of user-plane data and control-plane data by dividing the user-plane data and the control-plane data to the access link to the mobile relay 200 and the macro link to the donor eNB 100. Herein, the UE 300 conducts wireless communication of the user-plane data through the access link and wireless communication of the control-plane data through the macro link.

Furthermore, the UE 300 conducts wireless communication through the access link to the mobile relay 200 using the carrier frequency band 1 and conducts wireless communication through the macro link to the donor eNB 100 using the carrier frequency band 2 different from the carrier frequency band 1. Herein, the UE 300 may set any one of the carrier frequency band 1 and the carrier frequency band 2 as a primary carrier frequency band and set the other one as a secondary carrier frequency band. If a capacity of traffic data is equal to or lower than the reference data capacity, the UE 300 wirelessly communicates the whole traffic data using the primary carrier frequency band. If the capacity of traffic data is higher than the reference data capacity, the UE 300 wirelessly communicates the traffic data using both of the primary carrier frequency band and the secondary carrier frequency band.

Moreover, the UE 300 may wirelessly communicate control signaling information for controlling carrier aggregation of the primary and secondary carrier frequency bands using at least one of the primary carrier frequency band and the secondary carrier frequency band. For example, the UE 300 may wirelessly communicate the control signaling information for each of the primary and secondary carrier frequency bands using only the primary carrier frequency band.

Then, an operation and a wireless communication mode of the mobile relay 200 of the wireless communication system 10 will be described.

The mobile relay 200 is assigned a wireless resource from the donor eNB 100 to establish a backhaul link to the donor eNB 100. The mobile relay 200 establishes an access link to at least one UE 300 within the coverage. Further, the mobile relay 200 conducts wireless communication through the access link using the first frequency band with the UE 100 that establishes a macro link to the donor eNB 100 within its coverage. Wireless communication through the backhaul link and the macro link is conducted using the second frequency band.

Herein, the mobile relay 200 wirelessly communicates user-plane data through the access link to the UE 300. Herein, control-plane data are wirelessly communicated through the macro link between the UE 300 and the donor eNB 100.

Furthermore, the mobile relay 200 conducts wireless communication through the access link using the carrier frequency band 1, and if a capacity of traffic data of the UE 300 is higher than the reference data capacity, the mobile relay 200 wirelessly communicates a part of the traffic data through the access link. The remaining traffic data of the UE 300 are wirelessly communicated through the macro link between the UE 300 and the donor eNB 100 using the carrier frequency band 2 different from the carrier frequency band 1.

Moreover, the mobile relay 200 sets the carrier frequency band 1 as a primary carrier frequency band or a secondary carrier frequency band. In case of setting the carrier frequency band 1 as the primary carrier frequency band, if the capacity of traffic data is equal to or lower than the reference data capacity, the mobile relay 200 wirelessly communicates the whole traffic data through the access link. Further, if the capacity of traffic data is higher than the reference data capacity, the mobile relay 200 wirelessly communicates a part the traffic data through the access link. In case of setting the carrier frequency band 1 as the secondary carrier frequency band, if the capacity of traffic data is higher than the reference data capacity, the mobile relay 200 wirelessly communicates the remaining traffic data through the access link except traffic data wirelessly communicated through the macro link between the UE 300 and the donor eNB 100.

Furthermore, in case of setting the carrier frequency band 1 as the primary carrier frequency band, the mobile relay 200 wirelessly communicates control signaling information for controlling carrier aggregation of the primary and secondary carrier frequency bands using the carrier frequency band 1. In case of setting the carrier frequency band 1 as the primary carrier frequency band or the secondary carrier frequency band, the mobile relay 200 may wirelessly communicate the control signaling information for any one of the primary carrier frequency band and the secondary carrier frequency band using the carrier frequency band 1.

Then, an operation and a wireless communication mode of the donor eNB 100 of the wireless communication system 10 will be described.

The donor eNB 100 assigns a wireless resource to at least one mobile relay 200 within its coverage to establish a backhaul link. Further, the donor eNB 100 establishes a macro link to at least one UE 300 within the coverage. Herein, the mobile relay 200 conducts wireless communication through the macro link using the second frequency band with the UE 100 (that conducts wireless communication with the mobile relay 200 through an access link using the first frequency band within the coverage of the donor eNB 100). For reference, the second frequency band can be used for wireless communication through the backhaul link.

The donor eNB 100 wirelessly communicates control-plane data through the macro link to the UE 300. For reference, control signaling data included in the control-plane data are data for controlling wireless communication of user-plane data to a UE through an access link between the UE and a mobile relay.

Further, the donor eNB 100 conducts wireless communication through the macro link (or backhaul link) using the carrier frequency band 2. If the capacity of traffic data of the UE 300 is higher than the predetermined reference data capacity, the donor eNB 100 wirelessly communicates a part of the traffic data through the macro link. For reference, the remaining traffic data are wirelessly communicated through the access link using the carrier frequency band 1.

Furthermore, the donor eNB 100 sets the carrier frequency band 2 as any one of a primary carrier frequency band or a secondary carrier frequency band. In case of setting the carrier frequency band 2 as the primary carrier frequency band, if the capacity of traffic data is equal to or lower than the reference data capacity, the donor eNB 100 wirelessly communicates the whole traffic data through the macro link. Further, if the capacity of traffic data is higher than the reference data capacity, the donor eNB 100 wirelessly communicates a part of the traffic data through the macro link. In case of setting the carrier frequency band 2 as the secondary carrier frequency band, if the capacity of traffic data is higher than the reference data capacity, the donor eNB 100 wirelessly communicates the remaining traffic data through the macro link except traffic data wirelessly communicated through the access link.

Furthermore, in case of setting the carrier frequency band 2 as the primary carrier frequency band, the donor eNB 100 wirelessly communicates control signaling information for each of the primary carrier frequency band and the secondary carrier frequency band using the carrier frequency band 2. In case of setting the carrier frequency band 2 as the primary carrier frequency band or the secondary carrier frequency band, the donor eNB 100 may wirelessly communicate control signaling information corresponding to only the carrier frequency band 2.

Hereinafter, various exemplary embodiments of cooperative wireless communication modes between the donor eNB 100 and the mobile relay 200 in the wireless communication system 10 will be described with reference to FIG. 9 to FIG. 11.

Figure 9:
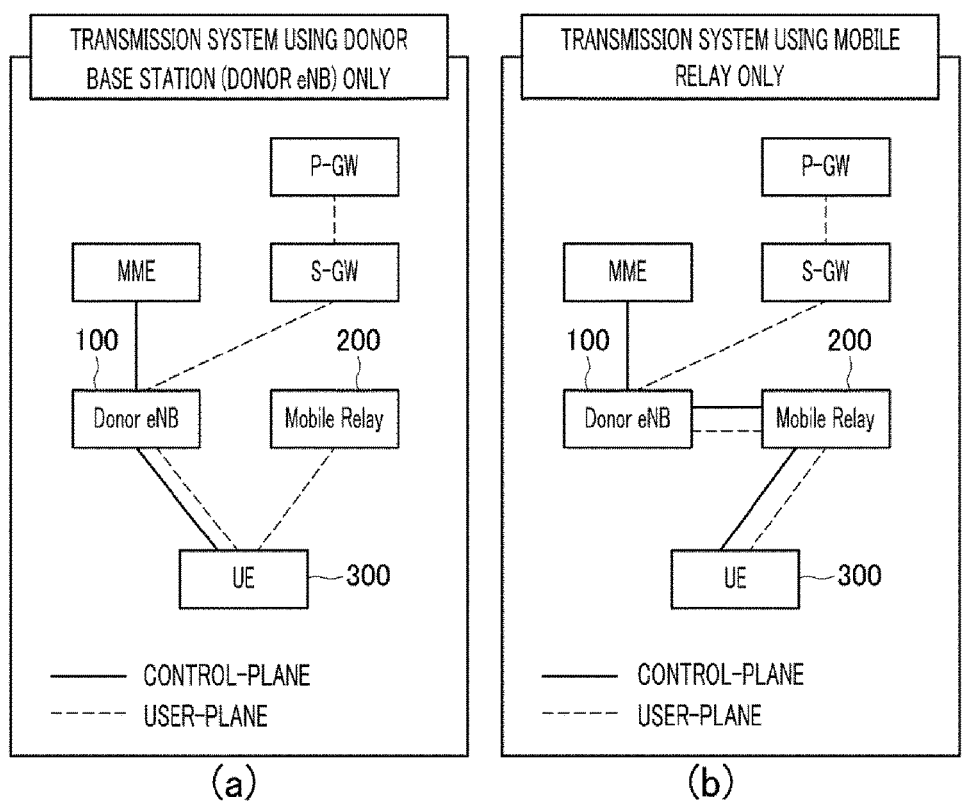
FIG. 9 is a diagram provided to explain a wireless communication mode when a user equipment is connected to any one of a donor base-station or a mobile relay in a wireless communication system in accordance with an exemplary embodiment.

FIG. 9 is a diagram provided to explain a wireless communication mode when a user equipment is connected to any one of a donor base-station or a mobile relay in a wireless communication system in accordance with an exemplary embodiment.

As illustrated in illustration (a) of FIG. 9, if the UE 300 is connected to the donor eNB 100 only, the UE 300 wirelessly communicates control-plane data and user-plane data directly with the donor eNB 100.

Specifically, the UE 300 wirelessly accesses the donor eNB 100 to establish a macro link and wirelessly communicates both of the control-plane data and the user-plane data through the macro link. The donor eNB 100 conducts wireless data communication between the UE 300 and a backbone network. For reference, FIG. 9 illustrates MME (Mobility Management Entity), P-GW (Packet Data Network Gateway) and S-GW (Serving Gateway) which are some of the components of the backbone network. Particularly, the MME manages a wireless network link in the backbone network. Herein, the donor eNB 100 wirelessly communicates the control-plane data of the UE 300 with the MME. Further, the donor eNB 100 wirelessly communicates the user-plane data of the UE 300 with the P-GW through the S-GW.

Further, as illustrated in illustration (b) of FIG. 9, if the UE 300 is connected to the mobile relay 200 only, the UE 300 wirelessly communicates control-plane data and user-plane data with the mobile relay 200.

Specifically, the UE 300 wirelessly accesses the mobile relay 200 to establish an access link and wirelessly communicates both of the control-plane data and the user-plane data through the access link. The mobile relay 200 conducts wireless data communication between the UE 300 and the backbone network through the donor eNB 100 that previously establishes a backhaul link. Herein, the mobile relay 200 wirelessly communicates the control-plane data and the user-plane data of the UE 300 with the donor eNB 100. Further, the donor eNB 100 wirelessly communicates the control-plane data with the MME and wirelessly communicates the user-plane data with the P-GW through the S-GW.

Meanwhile, FIG. 9 illustrates only a connection of the UE 300 with any one of the mobile relay 200 or the donor eNB 100. However, if a macro cell and a mobile relay cell coexist in the same coverage area, the UE 300 can simultaneously maintain connections with the macro cell and the mobile relay cell.

Figure 10:
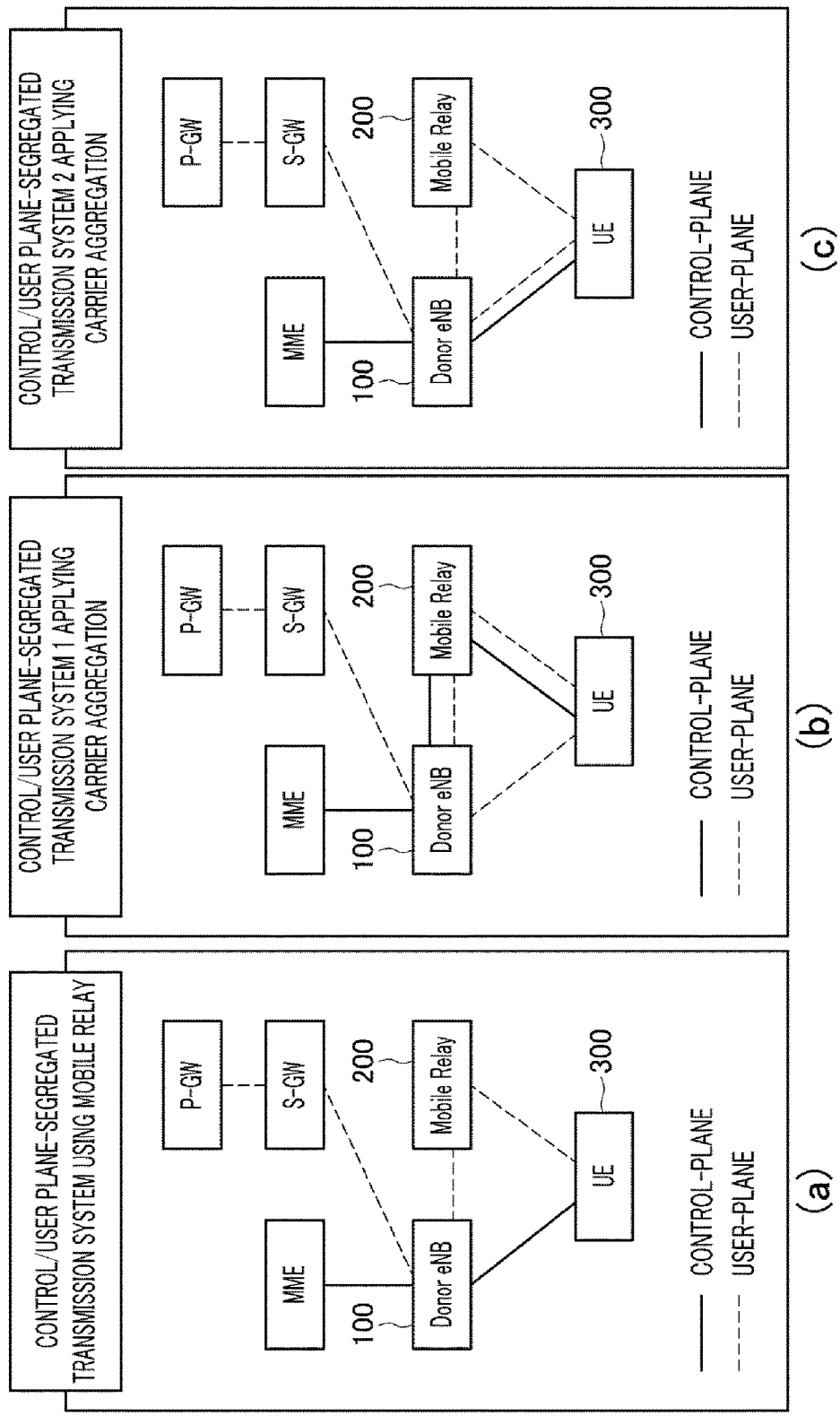
FIG. 10 is a diagram provided to explain a wireless communication mode when a user equipment is connected to both of a donor base-station and a mobile relay in a wireless communication system in accordance with an exemplary embodiment.

Specifically, FIG. 10 is a diagram provided to explain a wireless communication mode when a user equipment is connected to both of a donor base-station and a mobile relay in a wireless communication system in accordance with an exemplary embodiment.

As illustrated in illustration (a) of FIG. 10, the UE 300 is connected with each of the mobile relay 200 and the donor eNB 100. Herein, the UE 300 wirelessly communicates user-plane data through an access link to the mobile relay 200 and wirelessly communicates control-plane data through a macro link to the donor eNB 100. The donor eNB 100 wirelessly communicates user-plane data between the UE 300 and the backbone network through the donor eNB 100 that previously establishes a backhaul link. Further, the donor eNB 100 wirelessly communicates control-plane data between the UE 300 and the backbone network, and wirelessly communicates the user-plane data between the UE 300 and the backbone network through the mobile relay 200.

Further, in a state where the UE 300 is simultaneously connected with the mobile relay 200 and the donor eNB 100, the user-plane data can be wirelessly communicated at a high speed by carrier aggregation between a mobile relay cell and a macro cell. Illustration (b) of FIG. 10 illustrates that the UE 300 wirelessly communicates the control-plane data and the user-plane data through the access link to the mobile relay 200 and wirelessly communicates the user-plane data through the macro link to the donor eNB 100. Further, illustration (c) of FIG. 10 illustrates that the UE 300 wirelessly communicates the user-plane data through the access link to the mobile relay 200 and wirelessly communicates the control-plane data and the user-plane data through the macro link to the donor eNB 100. That is, in the wireless communication system 10 in accordance with an exemplary embodiment, the control-plane data are wirelessly communicated through any one of the macro cell or the mobile relay cell. Further, in the wireless communication system 10, if a capacity of traffic data is higher than the predetermined reference data capacity, the user-plane data are divided and wirelessly communicated through the macro cell or the mobile relay cell.

The wireless communication methods (hereinafter, referred to as "wireless communication modes") described above with reference to FIG. 9 and FIG. 10 can be dynamically changed if necessary and then used. That is, the wireless communication system 10 may determine an optimum wireless communication mode according to variables such as wireless communication environmental conditions, a wireless communication status of a wireless communication device and a network device, and a status of traffic data to be wirelessly communicated, and automatically change a wireless communication mode to the determined wireless communication mode.

Figure 11:
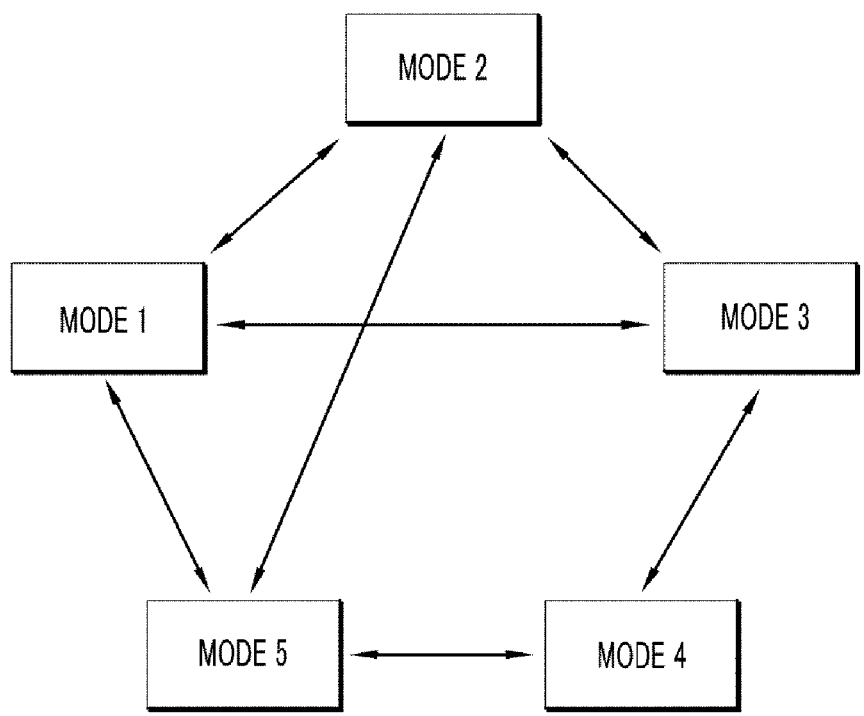
FIG. 11 is a status diagram provided to explain a dynamic change of wireless communication modes in a wireless communication system in accordance with an exemplary embodiment.

Specifically, FIG. 11 is a status diagram provided to explain a dynamic change of wireless communication modes in a wireless communication system in accordance with an exemplary embodiment.

For convenience in explanation, in FIG. 11, the wireless communication mode described in illustration (a) of FIG. 9 will be referred to as Mode 1 and the wireless communication mode described in illustration (b) of FIG. 9 will be referred to as Mode 3. Further, the wireless communication mode described in illustration (a) of FIG. 10 will be referred to as Mode 2, the wireless communication mode described in illustration (b) of FIG. 10 will be referred to as Mode 4, and the wireless communication mode described in illustration (c) of FIG. 10 will be referred to as Mode 5.

As illustrated in FIG. 11, the wireless communication mode managed in the wireless communication system 10 may be changed to at least one of the other wireless communication modes. Herein, Mode 1 and Mode 2 can be changed to other three modes except Mode 4, and Mode 3 can be changed to other three (i.e., Mode 1, Mode 2, and Mode 4) except Mode 5. Mode 4 can be changed to Mode 3 and Mode 5.

In each of Mode 1, Mode 2, and Mode 5, control-plane data are wirelessly communicated through a macro link between the UE 300 and the donor eNB 100, and they can be changed to each other.

For example, the wireless communication system 10 may wirelessly communicate both of control-plane data and user-plane data through a macro link in Mode 1 and may be changed to Mode 2 to wirelessly communicate the user-plane data through an access link. Further, when the wireless communication system 10 is changed from Mode 1 to Mode 5, the user-plane data can be divided and transmitted through the access link and the macro link by carrier aggregation between a macro cell and a mobile relay cell.

Meanwhile, from among Mode 1, Mode 2, and Mode 5, Mode 1 and Mode 2 can be changed to Mode 3 but Mode 5 cannot be changed to Mode 3. That is, Mode 1 and Mode 2 are modes for transmitting the user-plane data through any one of the access link and the macro link, but Mode 5 is a mode for transmitting the user-plane data through both of the access link and the macro link by carrier aggregation between a macro cell and a mobile relay cell. Therefore, Mode 5 cannot be changed to Mode 3 in which a macro link is not established between the UE 300 and the donor eNB 100.

As such, whether or not the wireless communication modes can be changed to each other may be set differently on the basis of whether or not the UE 300 is connected with a macro cell and a mobile relay cell in each mode and whether or not carrier aggregation is performed.

Hereinafter, a wireless communication system and method in accordance with another exemplary embodiment will be described in detail with reference to FIG. 12 and FIG. 13.

Figure 12:
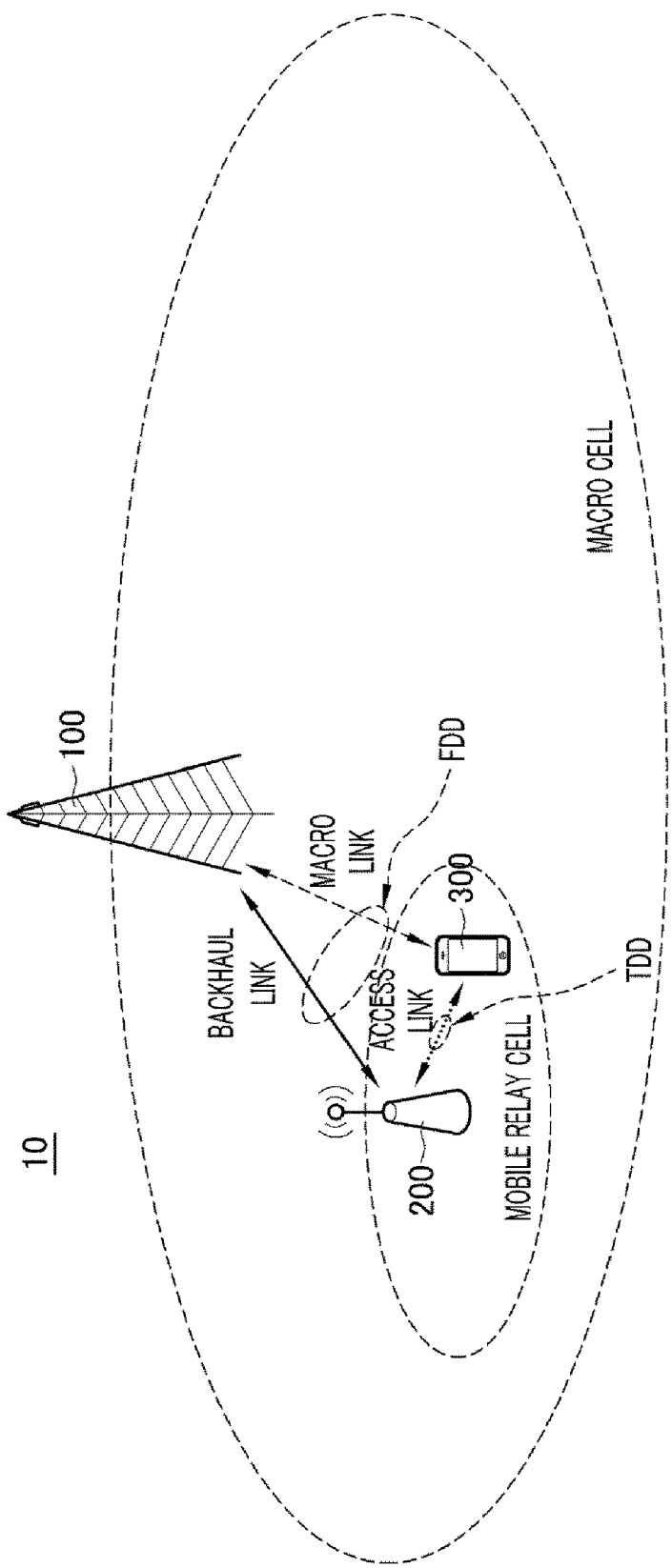
FIG. 12 is a diagram illustrating a configuration of a wireless communication system that uses a heterogeneous data transmission mode between a macro cell and a mobile relay cell in accordance with another exemplary embodiment.

FIG. 12 is a diagram illustrating a configuration of a wireless communication system that uses a heterogeneous data transmission mode between a macro cell and a mobile relay cell in accordance with another exemplary embodiment.

As illustrated in FIG. 12, in the wireless communication system 10 in accordance with another exemplary embodiment, a macro cell is configured according to a coverage of the donor eNB 100 and a mobile relay cell is configured according to a coverage of the mobile relay 200 located within the macro cell. Herein, the UE 300 wirelessly accesses each of the donor eNB 100 and the mobile relay 200 to establish a macro link between the UE 300 and the donor eNB 100 and establish an access link between the UE 300 and the mobile relay 200. Further, a backhaul link is established between the mobile relay 200 and the donor eNB 100. As such, the UE 300 can simultaneously maintain connections with the donor eNB 100 and the mobile relay 200.

Herein, in the wireless communication system 10, a data transmission mode in the macro link between the UE 300 and the donor eNB 100 and the backhaul link between the mobile relay 200 and the donor eNB 100 and a data transmission mode in the access link between the UE 300 and the mobile relay 200 are established differently. That is, the macro cell and the mobile relay cell use a heterogeneous data transmission mode.

Specifically, in the macro link between the UE 300 and the donor eNB 100 and the backhaul link between the mobile relay 200 and the donor eNB 100, a frequency division duplex (FDD) mode may be used to conduct wireless data communication. Further, in the access link between the UE 300 and the mobile relay 200, a time division duplex (TDD) mode may be used to conduct wireless data communication. In the FDD mode, upload and download frequency channels are separately managed. In the TDD mode, upload and download are transmitted with a time interval to the same frequency channel, so that it is possible to flexibly control distribution of upload/download wireless resources as compared with the FDD mode.

As such, if the TDD transmission mode is applied to the access link between the UE 300 and the mobile relay 200, control signaling for uplink (UL) and downlink (DL) through the access link can be set as follows.

Since the macro cell is highly likely to interfere with another adjacent macro cell, in case of using the TDD mode, a DL-UL configuration needs to be equally managed between the adjacent cells. Therefore, in the macro link and the backhaul link to the donor eNB 100, the FDD mode is used to conduct wireless data communication.

Meanwhile, since the mobile relay cell is spaced from an adjacent mobile relay cell by a predetermined distance or more, the mobile relay cells are highly likely not to interfere with each other. Therefore, a frame configuration can be set differently in the TDD mode for each mobile relay 200 within the same macro cell. For reference, the frame configuration is a resource assignment ratio of the DL and the UL.

Herein, the mobile relay 200 adjust the DL-UL configuration in real time according to a data transmission status and notifies information about the adjusted DL-UL configuration to the UEs 300 belonging to the same mobile relay 200 through control signaling or broadcast channel. If the mobile relays 200 within the same macro cell are adjacent to each other, the adjacent mobile relay 200 needs to be informed of the information about the adjusted DL-UL configuration from the mobile relay 200. Therefore, the information about the adjusted DL-UL configuration may be directly transmitted and received between the mobile relays 200 adjacent to each other. Further, each mobile relay 200 receives information about a broadcast channel of the adjacent mobile relay 200 from the UE 300 included in its mobile relay cell and then gives feedback thereon. Thus, it is possible to manage the information about the DL-UL configuration between the adjacent mobile relays 200.

Hereinafter, a wireless communication method using a heterogeneous data transmission mode between a macro cell and a mobile relay cell in a wireless communication system in accordance with an exemplary embodiment will be described in detail with reference to FIG. 13.

Figure 13:
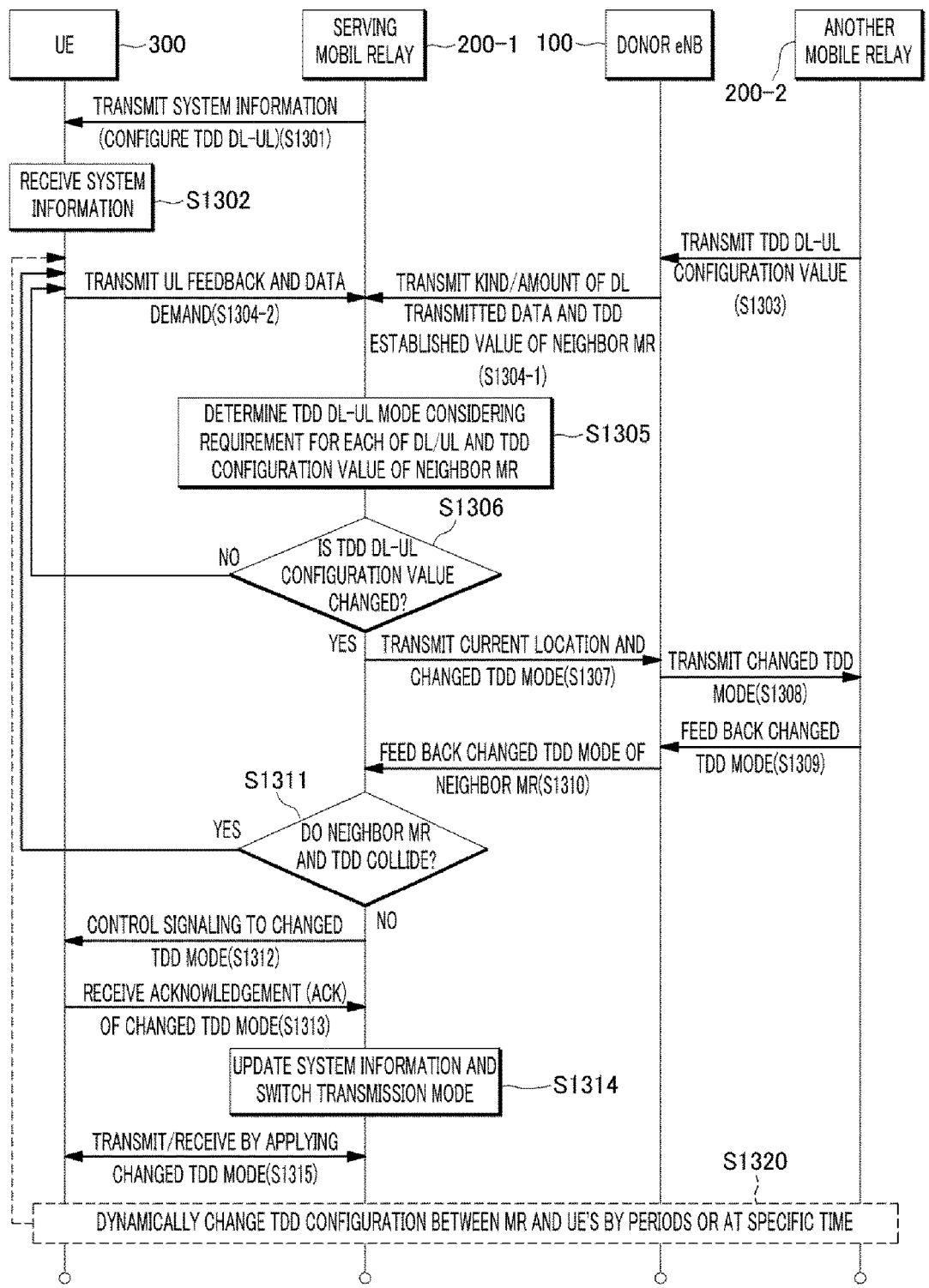
FIG. 13 is a data flowchart provided to explain a wireless communication method applying a heterogeneous data transmission mode between a macro cell and a mobile relay cell in accordance with another exemplary embodiment.

FIG. 13 is a data flowchart provided to explain a wireless communication method applying a heterogeneous data transmission mode between a macro cell and a mobile relay cell in accordance with another exemplary embodiment.

FIG. 13 illustrates a wireless communication process among the UE 300 included in a mobile relay cell of the mobile relay 200, a serving mobile relay 200-1 to which an access link from the UE 300 is established, another mobile relay 200-2 included in the same macro cell as the serving mobile relay 200-1, and the donor eNB 100.

Firstly, if the serving mobile relay 200-1 transmits system information to the UE 300 (S1301), the UE 300 receives the system information for establishing a TDD mode (S1302). The system information includes DL-UL configuration information in the TDD mode.

Further, the mobile relay 200-2 transmits its system information to the donor eNB 100 (S1303).

Then, the donor eNB 100 transmits the kind and capacity of DL data to the UE 300 and system information of a neighbor mobile relay (hereinafter, referred to as "TDD configuration values") to the serving mobile relay 200-1 (S1304-1).

After S1302, the UE 300 transmits UL feedback and data demand to the serving mobile relay 200-1 (S1304-2). Herein, S1303, S1304-1, and S1304-2 may be performed in series or in parallel, and the order may be changed.

Then, the serving mobile relay 200-1 establishes a requirement for each of pre-established DL/UL and a TDD DL-UL mode configuration value on the basis of the information received in each of S1304-1 and S1304-2 (S1305). Herein, the requirements include data QoS of transmission capacity of DL/UL, and the TDD DL-UL mode configuration value may be determined on the basis of a TDD configuration value of the neighbor mobile relay 200-2.

Then, the serving mobile relay 200-1 determines whether or not the TDD DL-UL mode configuration value established in S1305 is changed relative to a pre-established TDD DL-UL mode configuration value (S1306).

If the TDD DL-UL mode configuration value is not changed in S1306, the serving mobile relay 200-1 goes back before S1304-1 and S1304-2 and waits to receive a requirement for each DL/UL and a TDD configuration value.

Meanwhile, if the TDD DL-UL mode configuration value is changed in S1306, the serving mobile relay 200-1 transmits a current location and changed TDD mode configuration information to the donor eNB 100 (S1307).

Then, the donor eNB 100 transmits the changed TDD mode configuration information of the serving mobile relay 200-1 to the mobile relay 200-2 (S1308) and receives feedback on the changed TDD mode from the mobile relay 200-2 (S1309).

Then, the donor eNB 100 feeds back changed TDD mode configuration information of the neighbor mobile relay 200-2 to the serving mobile relay 200-1 (S1310).

Then, the serving mobile relay 200-1 determines whether or not there is a TDD conflict with the neighbor mobile relay 200-2 on the basis of the fed-back changed TDD mode of the neighbor mobile relay 200-2 (S1311).

As a result of determination in S1311, if there is a conflict with the neighbor mobile relay 200-2, the serving mobile relay 200-1 goes back before S1304-1 and S1304-2 and waits to receive a new requirement for each DL/UL and a TDD configuration value.

Meanwhile, as a result of determination in S1311, if there is no conflict with the neighbor mobile relay 200-2, the serving mobile relay 200-1 performs control signaling to the changed TDD mode (S1312).

Then, the serving mobile relay 200-1 receives acknowledgement ACK of the changed TDD mode from the UE 300 (S1313).

Then, the serving mobile relay 200-1 updates the system information to the changed and finally switches the TDD transmission mode according to the determined TDD mode configuration value (S1314).

Thus, wireless data communication can be conducted between the UE 300 and the serving mobile relay 200-1 in the changed TDD mode (S1315).

Further, as shown in S1320 of FIG. 13, a process of changing a TDD mode from S1301 to S1315 can be automatically performed by predetermined periods of time or at a specific time (i.e., in case of need to change a TDD mode). That is, in the access link between the mobile relay 200 and the UE 300, a TDD configuration can be dynamically changed and data communication can be conducted in an optimum TDD mode.

Meanwhile, there has been explained a wireless communication system in which a cooperative wireless communication mode and a heterogeneous data transmission mode are applied between a macro cell and a mobile relay cell. Hereinafter, a wireless communication system and method for conducting device-to-device (D2D) communication among multiple UEs included in the same mobile relay cell in accordance with yet another exemplary embodiment will be described in detail with reference to FIG. 14 to FIG. 16.

Figure 14:
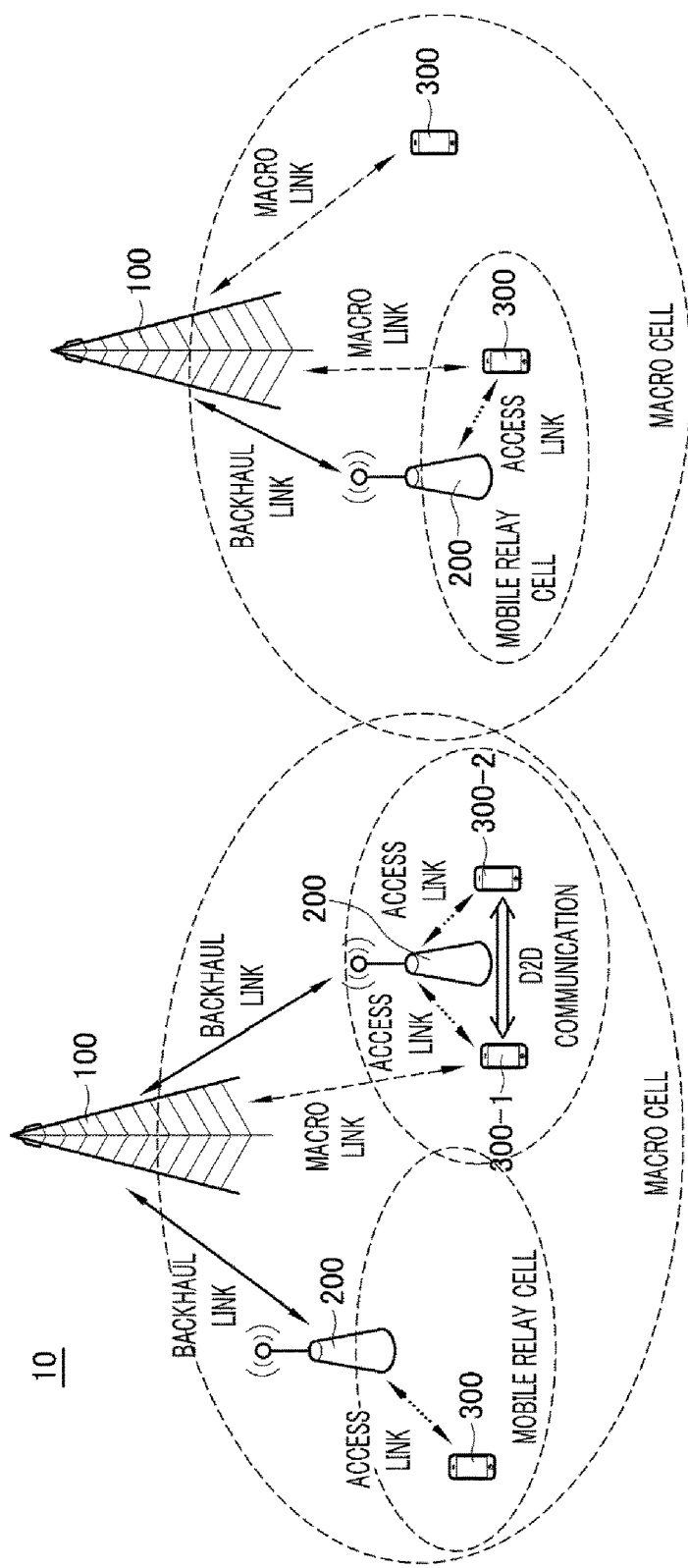
FIG. 14 is a diagram illustrating a configuration of a wireless communication system in which device-to-device (D2D) communication is conducted in accordance with yet another exemplary embodiment

FIG. 14 is a diagram illustrating a configuration of a wireless communication system in which device-to-device (D2D) communication is conducted in accordance with yet another exemplary embodiment.

As illustrated in FIG. 14, a D2D communication system 10 in accordance with yet another exemplary embodiment includes the donor eNB 100, the mobile relay 200, and the UE 300.

As illustrated in FIG. 14, if the UE 300 is located within a macro cell but not included in any mobile relay cell, the UE 300 is directly connected with the donor eNB 100 and conducts wireless communication. Further, if the mobile relay 200 and the donor eNB 100 are located within the same coverage, the UE 300 is connected with the mobile relay 200 and conducts wireless communication with the donor eNB 100 through the mobile relay 200 or wirelessly accesses each of the mobile relay 200 and the donor eNB 100 and conducts wireless communication with them while simultaneously maintaining connections with them.

Further, multiple UEs 300-1 and 300-2 included in a mobile relay cell of any one mobile relay 200 can conduct D2D communication that enables direct communication of data. That is, in the wireless communication system 10 in accordance with yet another exemplary embodiment, D2D wireless communication can be conducted between two or more UEs 300 from among multiple UEs 300 included in the same mobile relay cell or between multiple UEs 300 included in a predetermined group without passing through the mobile relay 200.

Hereinafter, a D2D communication mode between UEs 300 within a mobile relay cell in accordance with still another exemplary embodiment will be described in detail with reference to FIG. 15 and FIG. 16.

Figure 15:
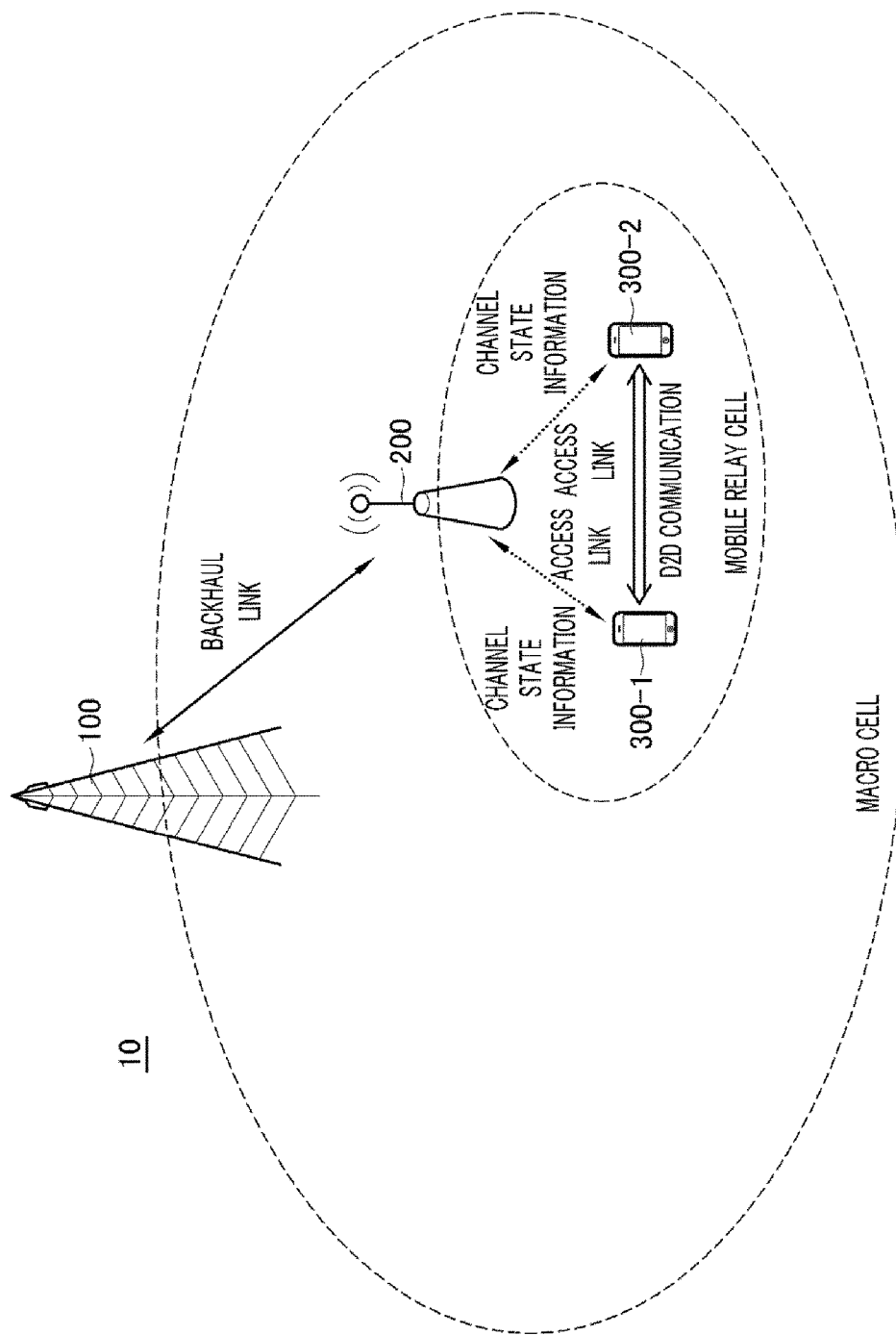
FIG. 15 is a configuration diagram provided to explain a D2D communication method of a wireless communication system in accordance with still another exemplary embodiment.

FIG. 15 is a configuration diagram provided to explain a D2D communication method of a wireless communication system in accordance with still another exemplary embodiment.

As illustrated in FIG. 15, if the multiple UEs 300-1 and 300-2 are included in a mobile relay cell, each of the multiple UEs 300-1 and 300-2 wirelessly accesses the mobile relay 200 to establish an access link to the mobile relay 200. For reference, uplink (UL) and downlink (DL) communication for each of the UEs 300-1 and 300-2 that conducts D2D communication or at least one UE (not illustrated) that is not involved in D2D communication is conducted through a backhaul link between the mobile relay 200 and the donor eNB 100.

Herein, between the UEs 300-1 and 300-2 included in the same mobile relay cell, infrastructure-based D2D communication is conducted. In the infrastructure-based D2D communication, the mobile relay 200 controls the D2D communication and only actual user data (i.e., traffic data) are transmitted and received between the UEs 300-1 and 300-2.

The UEs 300-1 and 300-2 directly transmit and receive the traffic data and feedback information such channel information and channel quality indicator (CQI) relevant to traffic data transmission to the mobile relay 200 through the access link. The mobile relay 200 reflects the fed-back information to the next resource assignment. For reference, the UEs 300-1 and 300-2 perform HARQ for traffic data through D2D communication and thus can improve the reliability of data commination.

The UEs 300-1 and 300-2 transmit channel state information of a wireless resource previously assigned for D2D communication and a channel state information reference signal (CSI-RS) and a demodulation reference signal (DM-RS) for demodulation in D2D communication to the mobile relay 200. The DM-RS is a signal used for coherent demodulation in D2D communication. The UE 300-1 or 300-2 performs coherent demodulation on the basis of a DM-RS transmitted from another UE. The CSI-RS is a signal used for collecting channel information in D2D communication. The mobile relay 200 transmits a CSI-RS to each of the UEs 300-1 and 300-2. Herein, CSI-RS values (i.e., channel state information) measured in the respective UEs 300-1 and 300-2 are fed back to the mobile relay 200 and then reflected to the next wireless resource assignment scheduling.

The mobile relay 200 previously manages information about whether the UEs 300-1 and 300-2 within the coverage of the mobile relay cell use a D2D mode and information about a wireless resource being used.

The mobile relay 200 transmits control signaling data to the UEs 300-1 and 300-2 involved in D2D communication through the access link. The control signaling data include information for D2D mode configuration such as information about a resource assigned for D2D communication, a transmission format, and transmission power.

The mobile relay 200 determines resource assignment, a transmission format, and transmission power on the basis of a distance between the UEs 300-1 and 300-2 that conduct D2D communication, channel state information, and rank information of a D2D communication link. Further, the mobile relay 200 transmits the result of determination to the UEs 300-1 and 300-2 by control signaling.

Meanwhile, in the mobile relay cell, a part of a UL communication resource for the access link may be used during D2D communication to transmit/receive data between two or more UEs or multiple UEs within a predetermined group.

Specifically, wireless communication between the UE 30 and the mobile relay 200 and between the UEs 300-1 and 300-2 in the mobile relay cell may use at least one of the FDD mode and the TDD mode.

As such, a transmission mode in D2D communication varies depending on the kind of data transmission mode (i.e., FDD and TDD).

In case of using the FDD mode in D2D communication, the mobile relay 200 assigns a part of a frequency band used for UL communication of the access link as a wireless resource for D2D communication. Otherwise, in case of using the TDD mode in D2D communication, the mobile relay 200 assigns a part of a time band used for UL communication of the access link as a wireless resource for D2D communication. This is because a DL communication resource is used not only by the UEs 300-1 and 300-2 that conduct D2D communication but also by other UEs.

Each of the UEs 300-1 and 300-2 using the FDD mode in D2D communication includes a module for transmitting/receiving a frequency band for UL communication in the mobile relay cell. Further, each of the UEs 300-1 and 300-2 using the TDD mode in D2D communication includes a module for transmitting/receiving a time slot for UL communication in the mobile relay cell.

Hereinafter, operations of the respective components of the wireless communication system 10 in accordance with still another exemplary embodiment will be described in detail.

The UE 300 wirelessly accesses the mobile relay 200 to establish an access link and is assigned a wireless resource for D2D communication with another UE included in the mobile relay cell. Further, the UE 300 uses the assigned wireless resource to conduct D2D communication with at least one another UE.

The UE 300 receives control signaling data for controlling D2D communication from the mobile relay 200 through the access link, and directly conducts wireless communication of traffic data with another UE through D2D communication.

The UE 300 is assigned a part of a wireless resource used for UL communication for the access link from the mobile relay 200. Herein, if the UE 300 conducts wireless communication in the FDD mode through the access link, the UE 300 is assigned a part of a frequency band used for UL communication, and if the UE 300 conducts wireless communication in the TDD mode through the access link, the UE 300 is assigned a part of a time band used for UL communication.

The UE 300 transmits, to the mobile relay 200, a "D2D communication mode configuration request" including information about at least one another UE with which the UE 300 wants to conduct D2D communication, and is assigned a wireless resource corresponding to the "D2D communication mode configuration request" from the mobile relay 200. Herein, the UE 300 transmit, to the mobile relay 200, state information of a channel with respect to the at least one another UE, and receives wireless resource assignment information and transmission format information for D2D communication determined by the mobile relay 200 on the basis of the channel state information. Then, the UE 300 transmits a demodulation reference signal based on the transmission formation information to the at least one another UE.

The mobile relay 200 wirelessly accesses multiple UEs 300 included in the mobile relay cell to establish an access link to each of the UEs 300. Then, the mobile relay 200 receives the "D2D communication mode configuration request" with respect to at least one another UE 300 within the corresponding mobile relay cell from any one UE (hereinafter, referred to as "D2D communication request device") 300 through the access link. Then, the mobile relay 200 determines a wireless resource for D2D communication on the basis of predetermined D2D communication conditions, and assigns the determined wireless resource to the D2D communication request device 300 and the UE 300 as a counterpart thereto. Further, the mobile relay 200 transmits control signaling data for controlling D2D communication to the D2D communication request device 300 through the access link. The assigned wireless resource is used to directly transmit and receive traffic data between the D2D communication request device 300 and the UE 300 as a counterpart thereto.

Further, the mobile relay 200 assigns a part of a wireless resource used for UL communication of the UE 300 through the access link as a wireless resource for D2D communication. If the mobile relay 200 conducts wireless communication in the FDD mode through the access link, the mobile relay 200 assigns a part of a frequency band used for UL communication as a wireless resource for D2D communication, and if the mobile relay 200 conducts wireless communication in the TDD mode through the access link, the mobile relay 200 assigns a part of a time band used for UL communication UL as a wireless resource for D2D communication.

Furthermore, the mobile relay 200 receives a D2D communication mode configuration request including information about at least one another UE 300 from the D2D communication request device 300 through the access link. Then, the mobile relay 200 receives channel state information from the UEs 300 to be involved in D2D communication, and assigns the wireless resource for D2D communication on the basis of the received channel state information. Moreover, the mobile relay 200 transmits wireless resource assignment information and transmission format information for D2D communication to the UEs 300 to be involved in D2D communication.

Hereinafter, a procedure for a D2D communication method in accordance with still another exemplary embodiment will be described in detail with reference to FIG. 16.

Figure 16:
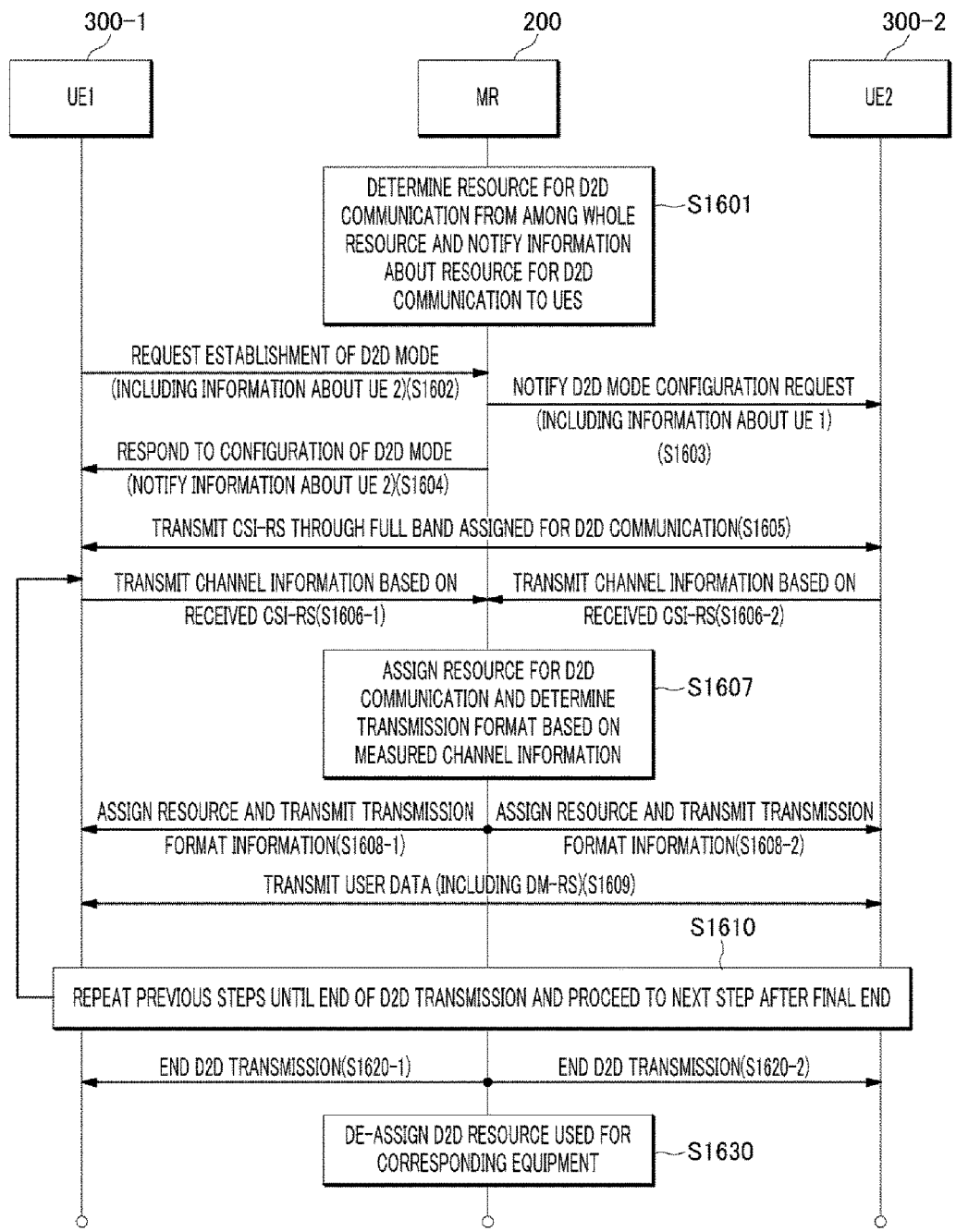
FIG. 16 is a data flowchart provided to explain a D2D communication method using a mobile relay in accordance with still another exemplary embodiment.

FIG. 16 is a data flowchart provided to explain a D2D communication method using a mobile relay in accordance with still another exemplary embodiment.

FIG. 16 illustrates a data flow between a UE1 300-1 that requests D2D communication and a UE2 300-2 with which the UE1 300-1 wants to conduct D2D communication from among multiple UEs 300 included in a mobile relay cell. For reference, the UE2 300-2 may be at least one UE 300 included in a predetermined group together with the UE1 300-1. Herein, access links are established between the respective UEs 300-1 and 300-2 and the mobile relay (MR) 200, and wireless communication between the UEs 300-1 and 300-2 and the MR 200 is conducted through the access links, respectively.

Firstly, the MR 200 determines a resource for D2D communication from among the whole wireless resource managed by the MR 200, and notifies information about the determined resource for D2D communication to all of the UEs 300 within the mobile relay cell (S1601).

For example, the wireless resource managed by the MR 200 may be a wireless resource assigned from the donor eNB 100. Further, the UEs 300 within the coverage of the MR 200 include the UE1 300-1 and the UE2 300-2.

In this state, the UE1 300-1 requests configuration of a D2D mode with respect to another UE (i.e., UE2 300-2) within the same mobile relay cell to the mobile relay 200 (S1602).

Herein, the D2D mode configuration request includes identification information (e.g., telephone number, etc.) of the UE2 300-2.

In response to the D2D mode configuration request from the UE1 300-1, the mobile relay 200 notifies the D2D mode configuration request to the UE2 300-2 (S1603).

Herein, the notification of the D2D mode configuration request to the UE2 300-2 includes identification information (e.g., telephone number, etc.) of the UE1 300-1.

Then, the MR 200 transmits acknowledgement ACK of the D2D mode configuration request from the UE2 300-2 to the UE1 300-1 (S1604).

Then, in order to measure a state of a channel to be used for D2D communication, the UEs 300-1 and 300-2 transmit a CSI-RS to each other through a full band previously assigned for D2D communication (S1605).

Herein, in order to efficiently measure a channel state, the UEs 300-1 and 300-2 may transmit the CSI-RS in a comb mode through the assigned full band, or transmit the CSI-RS only through a predetermined sample band.

Then, the UE1 300-1 and the UE2 300-2 that receive the CSI-RSs from each other transmit channel state information based on the received CSI-RS, respectively, to the MR (S1606-1 and S1606-2).

Herein, S1606-1 and S1606-2 may be performed in series or in parallel, and the order may be changed.

Then, the MR 200 assigns the wireless resource for D2D communication on the basis of the channel state information measured from the UE 1 and UE2 300-1 and 300-2, and determines a transmission format (S1607).

Then, the MR 200 transmits the determined wireless resource assignment information and transmission format information for D2D communication to each of the UE 1 and UE2 300-1 and 300-2 (S1608-1 and S1608-2). Herein, S1608-1 and S1608-2 may be performed in series or in parallel, and the order may be changed.

Then, the UE 1 and UE2 300-1 and 300-2 use the assigned wireless resource to transmit and receive user data to and from each other (S1609).

Herein, each of the UE 1 and UE2 300-1 and 300-2 may transmit a DM-RS to each other. For reference, the DM-RS refers to information that enables a UE as a counterpart to demodulate received data. The DM-RS is transmitted through the assigned wireless resource, and the CSI-RS may be transmitted through a non-assigned wireless resource during D2D commination to be conducted.

Meanwhile, the process from S1601 to S1609 is repeated until data transmission through the D2D communication between the UE 1 and UE2 300-1 and 300-2 is ended. Then, if the data transmission through the D2D communication between the UE 1 and UE2 300-1 and 300-2 is ended, the repetition of the process is ended to proceed to the next step (S1620).

If the data transmission through the D2D communication between the UE 1 and UE2 300-1 and 300-2 is ended as such, the MR 200 notifies the end of the D2D communication to each of the UE 1 and UE2 300-1 and 300-2 (S1620-1 and S1620-2).

Herein, S1620-1 and S1620-2 may be performed in series or in parallel, and the order may be changed.

Then, the MR 200 de-assigns the wireless resource for D2D communication used for the UE 1 and UE2 300-1 and 300-2 (S1630).

Meanwhile, FIG. 14 to FIG. 16 illustrate the MR 200 included in the wireless communication system 10 in accordance with still another exemplary embodiment and a D2D communication mode between the UEs 300 included in the same MR 200. For reference, the wireless communication system 10 may include a fixed relay constituting a fixed relay cell at a fixed location instead of the MR 200 which can move autonomously. In this case, in the wireless communication system 10 in which D2D communication is conducted, all the components and the operations described with reference to FIG. 14 to FIG. 16 can be applied. Particularly, D2D commination can be conducted between multiple UEs 300 included in the fixed relay cell.

The exemplary embodiments of the present disclosure can be embodied in a storage medium including instruction codes executable by a computer such as a program module executed by the computer. Besides, the data structure in accordance with the embodiment of the present disclosure can be stored in the storage medium executable by the computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A user equipment included in a wireless communication system, wherein the user equipment wirelessly accesses a mobile relay to establish an access link, wirelessly accesses a donor base-station to establish a macro link, simultaneously maintains connections with the donor base-station and the mobile relay coexisting in the same coverage area, and conducts wireless communication with the mobile relay through the access link using a pre-established first frequency band and conducts wireless communication with the donor base-station through the macro link using a pre-established second frequency band,
   wherein a data transmission mode used for the access link is a time division duplex mode,
   the data transmission mode used for the macro link is a frequency division duplex mode, and
   the user equipment dynamically changes a resource assignment ratio for each of uplink and downlink through the access link according to predetermined conditions of change and transmits change information of the resource assignment ratio to the mobile relay, and
   the change information of the resource assignment ratio is used in changing a resource assignment ratio of another user equipment within a coverage of the mobile relay as the conditions of change.

2. The user equipment of claim 1,
   wherein the user equipment includes a multi-band wireless communication module that conducts wireless communication using multiple frequency bands,
   conducts the wireless communication through the access link and the macro link using the multi-band wireless communication module, and
   the first frequency band is higher than the second frequency band.

3. The user equipment of claim 1,
   wherein the user equipment wirelessly communicates user-plane data including traffic data and data according to a protocol applied to an application layer through the access link, and the user equipment wirelessly communicates control-plane data including control signaling data for controlling the wireless communication of the user-plane data through the macro link.

4. The user equipment of claim 1,
wherein the user equipment conducts wireless communication through the access link using a pre-established first carrier frequency band,
conducts wireless communication through the macro link using a second carrier frequency band different from the first carrier frequency band,
sets any one of the first and second carrier frequency bands as a primary carrier frequency band and the other one as a secondary carrier frequency band, and
if a capacity of traffic data is equal to or lower than a predetermined reference data capacity, the user equipment wirelessly communicates the traffic data using the primary carrier frequency band, and
if the capacity of the traffic data is higher than the reference data capacity, the user equipment wirelessly communicates the traffic data using the primary and secondary carrier frequency bands together.

5. The user equipment of claim 4,
wherein in case of using the primary and secondary carrier frequency bands together, the user equipment wirelessly communicates a part of the traffic data through the access link using the first carrier frequency band, and
wirelessly communicates the remaining traffic data through the macro link using the second carrier frequency band.

6. The user equipment of claim 4,
wherein the user equipment wirelessly communicates control signaling information for each of the primary carrier frequency band and the secondary carrier frequency band using each of the primary carrier frequency band and the secondary carrier frequency band or using the primary carrier frequency band only, and
the control signaling information includes information for controlling the primary and secondary carrier frequency bands to be used together.

7. The user equipment of claim 1,
wherein the mobile relay is assigned a wireless resource from a donor base-station wirelessly connected with the mobile relay to establish a backhaul link to the donor base-station,
wirelessly accesses at least one user equipment within a predetermined coverage to establish an access link,
conducts wireless communication with the user equipment through the access link using the first frequency band, and
conducts wireless communication through the macro link using the second frequency band.

8. The user equipment of claim 1,
wherein the donor base-station assigns a wireless resource to at least one mobile relay which is located within a predetermined coverage and wirelessly connected with the donor base-station to establish a backhaul link,
wirelessly accesses at least one user equipment within the coverage to establish a macro link, and
conducts wireless communication through the macro link and the backhaul link using the second frequency band.

9. The user equipment of claim 1,
wherein a data transmission mode used for a backhaul link established between the donor base-station and the mobile relay is the frequency division duplex mode.

10. The user equipment of claim 1,
wherein the donor base-station receives the change information of the resource assignment ratio for each of the user equipments for each of multiple mobile relays within a coverage, and
transfers the received change information of the resource assignment ratio for each mobile relay to each of at least one adjacent mobile relay.

11. A wireless communication method of a user equipment included in a wireless communication system, comprising:
establishing a macro link by wireless access to a donor base-station;
establishing an access link by wireless access to a mobile relay; and
simultaneously maintaining connections with the donor base-station and the mobile relay coexisting in the same coverage area,
wherein the access link uses a pre-established first frequency band and the macro link uses a pre-established second frequency band,
wherein the step of simultaneously maintaining of connections includes:
conducting wireless communication through the access link using a time division duplex mode;
conducting wireless communication through the macro link using a frequency division duplex mode;
dynamically changing a resource assignment ratio for each of uplink and downlink through the access link according to predetermined conditions of change; and
transmitting change information of the resource assignment ratio to the mobile relay,
wherein the change information of the resource assignment ratio is used in changing a resource assignment ratio of another user equipment within a coverage of the mobile relay as the conditions of change.

12. The wireless communication method of a user equipment of claim 11, wherein the first frequency band is higher than the second frequency band.

13. The wireless communication method of a user equipment of claim 11,
wherein the step of simultaneously maintaining of connections includes:
wirelessly communicating user-plane data through the access link; and
wirelessly communicating control-plane data through the macro link, and
the user-plane data include traffic data and data according to a protocol applied to an application layer, and
the control-plane data include control signaling data for controlling the wireless communication of the user-plane data.

14. The wireless communication method of a user equipment of claim 11,
wherein the step of simultaneously maintaining of connections includes:
conducting wireless communication through the access link using a pre-established first carrier frequency band; and
conducting wireless communication through the macro link using a second carrier frequency band different from the first carrier frequency band.

15. The wireless communication method of a user equipment of claim 11, wherein the step of simultaneously maintaining of connections includes:

conducting wireless communication through a backhaul link established between the donor base-station and the mobile relay using the frequency division duplex mode.

\* \* \* \* \*